US005868821A

United States Patent [19]

Torii et al.

[11] Patent Number: 5,868,821

[45] Date of Patent: Feb. 9, 1999

[54] THERMALLY REVERSIBLE COLOR FORMING COMPOSITION AND THERMALLY REVERSIBLE RECORDING MEDIUM USING THE THERMALLY REVERSIBLE COLOR FORMING COMPOSITION

[75] Inventors: Masafumi Torii, Shizuoka; Shoji Maruyama, Yokohama; Fumio Kawamura, Shizuoka; Hiromi Furuya, Shimizumachi; Kyoji Tsutsui, Mishima; Katsuhisa Kamio, Kakamigahara; Katsushi Sugiyama, Inzai; Kazuo Hosoda, Miyashiromachi; Masatake Kawashima, Funabashi; Masafumi Moriya, Kasukabe; Hiroaki Matsui, Numazu; Masaru Shimada, Shizuoka-Ken, all of Japan

[73] Assignees: Richo Company, Ltd.; Miyoshi Yushi Kabushiki Kaisha, both of Tokyo, Japan

[21] Appl. No.: 791,747

[22] Filed: Jan. 30, 1997

[30] Foreign Application Priority Data

| | | | |
|---|---|---|---|
| Jan. 31, 1996 | [JP] | Japan | 8-035720 |
| Feb. 26, 1996 | [JP] | Japan | 8-065385 |
| Feb. 26, 1996 | [JP] | Japan | 8-065386 |
| Feb. 26, 1996 | [JP] | Japan | 8-065387 |
| Feb. 26, 1996 | [JP] | Japan | 8-065388 |
| Jul. 2, 1996 | [JP] | Japan | 8-191557 |
| Jan. 20, 1997 | [JP] | Japan | 9-020999 |

[51] Int. Cl.[6] .......... C09D 11/02

[52] U.S. Cl. .......... 106/31.17; 106/31.18; 106/31.23

[58] Field of Search .......... 106/31.17, 31.18, 106/31.23

[56] References Cited

U.S. PATENT DOCUMENTS

| | | | |
|---|---|---|---|
| 4,623,391 | 11/1986 | Seitz | 106/31.17 |
| 4,720,301 | 1/1988 | Kito et al. | 106/31.17 |
| 4,732,810 | 3/1988 | Kito et al. | 106/31.17 |
| 4,865,648 | 9/1989 | Kito et al. | 106/31.17 |
| 5,178,669 | 1/1993 | Watanabe et al. | 106/31.17 |
| 5,185,194 | 2/1993 | Miyake et al. | 428/64 |
| 5,306,687 | 4/1994 | Furuya et al. | 503/207 |
| 5,306,689 | 4/1994 | Maruyama et al. | 503/217 |
| 5,376,616 | 12/1994 | Hamano et al. | 106/31.17 |
| 5,380,693 | 1/1995 | Goto | 503/200 |
| 5,395,433 | 3/1995 | Maruyama et al. | 106/31.17 |
| 5,403,810 | 4/1995 | Sawamura et al. | 503/201 |
| 5,447,900 | 9/1995 | Suzaki et al. | 503/207 |
| 5,482,912 | 1/1996 | Furuya et al. | 503/207 |
| 5,489,501 | 2/1996 | Torii et al. | 430/341 |
| 5,521,138 | 5/1996 | Shimada et al. | 503/209 |
| 5,532,201 | 7/1996 | Goto | 503/213 |
| 5,547,500 | 8/1996 | Tsutsui | 106/31.2 |

*Primary Examiner*—Helene Klemanski
*Attorney, Agent, or Firm*—Oblon, Spivak, McClelland, Maier & Neustadt, P.C.

[57] ABSTRACT

A thermally reversible color forming composition which includes an electron-donating chromophoric compound and an electron-accepting compound, by which formation and deletion of a color image may be carried out by adjusting thermal energy applied to the composition, wherein the electron-accepting compound is a carboxylic acid compound having the following general formula (1):

$$R_1—X—R_2—COOH \quad (1)$$

in which, X represents a divalent group having at least one hetero atom, $R_1$ represents a hydrocarbon group having at least one hetero atom, $R_2$ represents an aliphatic hydrocarbon group, which may be substituted and whose principle chain contains less than 6 carbon atoms.

11 Claims, 1 Drawing Sheet

THERMALLY REVERSIBLE COLOR FORMING COMPOSITION AND THERMALLY REVERSIBLE RECORDING MEDIUM USING THE THERMALLY REVERSIBLE COLOR FORMING COMPOSITION

BACKGROUND OF THE INVENTION

1. Field of the Invention

The present invention relates to a thermally reversible color forming composition and a thermally reversible recording medium using the thermally reversible color forming composition. More particularly, the present invention relates to thermally reversible color forming compositions which involves a color forming reaction between an electron-donating chromophoric compound and an electron-accepting compound, and thermally reversible recording media using the thermally reversible color forming composition, by which a formation and a deletion of an image may be carried out by adjusting thermal energy applied to the composition.

2. Description of the Related Art

Thermal recording media which use a color producing reaction between an electron-donating chromophoric compound (hereinafter also referred to as a "color-producing agent" or "leuco dye") and an electron-accepting compound (hereinafter also referred to as a "color developer") in a recording layer is well known in the art. These recording media are generally used for a printer of a facsimile, a word processor, a scientific instrument and so on.

However, all of the conventional recording media which are practically used are non-reversible type recording media. That is, once a color is produced on the recording medium, it is non-reversibly fixed on the medium. Therefore, it is not possible to delete an image picture on the medium and to use the medium repeatedly.

On the other hand, a thermally reversible recording medium which can perform a reversible formation and a deletion of a colored image is disclosed in Japanese Laid-Open Patent Application No.60-193691 in which a combination of gallic acid and fluoroglucinol is used as the color developer, Japanese Laid-Open Patent Application No.61-237684 in which compounds such as phenol phthalene and thymol phthalene are used as the color developer, Japanese Laid-Open Patent Application Nos.62-138556, 62-138568 and 62-140881 in which a homogeneous mixture of a color-producing agent, a color developer and a carboxylate is contained in a recording layer, Japanese Laid-Open Patent Application No.63-173884 in which a derivative of ascorbic acid is used as a color developer, and Japanese Laid-Open Patent Application Nos.2-188293 and 2-18294 in which a salt of bis(hydroxyphenyl) acetic acid or gallic acid with higher aliphatic amine is used as a color developer.

However, these conventional thermally reversible recording media have problems such as compatibility in color-producing stability and color deletion ability, sufficient concentration of produced colors, and stability when used repeatedly. Therefore, these thermally reversible media are generally not suitable for practical use.

It is disclosed, in Japanese Laid-Open Patent Application No.5-124360, a thermally reversible color forming composition comprising an organic phosphate compound having a long-chain aliphatic hydrocarbon group, an aliphatic carboxylic acid or a phenol compound as a color developer and a leuco dye as a color producing agent. By using the above composition, it is possible to carry out a formation and deletion of colors relatively easily, and a stability of such formation and deletion of colors may be maintained during repeated use. In the above Patent Application No.5-124360, a thermally reversible recording medium using the thermally reversible color forming composition in a recording layer is also disclosed. The recording medium has an advantage, compared with other conventional recording media, in that an excellent stability of color formation, color deletion, and a concentration of produced colors may be achieved. However, its color deletion rate is rather slow for practical use. Thus, development of thermally reversible recording medium in which a colored image once formed can be deleted at a practically sufficient speed and yet provide stability so that colors can be maintained is desired.

SUMMARY OF THE INVENTION

Accordingly, it is a general object of the present invention to provide a thermally reversible color forming composition and a thermally reversible recording medium using the thermally reversible color forming composition.

A more specific object of the present invention is to provide a thermally reversible color forming composition and a thermally reversible recording medium using the thermally reversible color forming composition, by which a stability in color formation and color deletion may be maintained, and a sufficient deletion speed of a colored image may be attained.

It is another object of the present invention to provide a thermally reversible color forming composition involving a color forming reaction between an electron-donating chromophoric compound and an electron-accepting compound, and a thermally reversible recording medium using the thermally reversible color forming composition, by which a formation and a deletion of an image may be carried out by adjusting thermal energy applied to the composition.

The objects described above are achieved by a thermally reversible color forming composition comprising an electron-donating chromophoric compound and an electron-accepting compound, by which a color may be formed and deleted depending on at least one of a temperature for the thermally reversible color forming composition and a cooling rate for the thermally reversible color forming composition after heating the thermally reversible color forming composition, wherein a carboxylic acid compound having the following general formula:

$$R_1—X—R_2—COOH$$

(wherein, X represents a divalent group having at least one hetero atom, $R_1$ represents a hydrocarbon group which may be substituted and $R_2$ represents an aliphatic hydrocarbon group, which may be substituted and whose principle chain containing less than 6 carbon atoms) is used as the electron-accepting compound.

The objects described above are also achieved by the thermally reversible color forming composition, wherein $R_1$ is substituted by a substituent selected from a group consisting of a hydroxy group, halogens and alkoxy groups.

The objects described above are also achieved by the thermally reversible color forming composition, wherein $R_2$ is substituted by a substituent selected from a group consisting of a hydroxy group and halogens.

The objects described above are also achieved by the thermally reversible color forming composition, wherein $R_1$ is substituted by a substituent selected from a group consisting of a hydroxy group, halogens and alkoxy groups and $R_2$ is substituted by a substituent selected from a group consisting of a hydroxy group and halogens.

The objects described above are also achieved by the thermally reversible color forming composition, wherein the carboxylic acid compound has the following general formula:

$$CH_3(CH_2)_{m-1}—X—(CH_2)_n—COOH$$

wherein m represents an integer between 8 and 22 and n represents an integer between 0 and 6.

The objects described above are also achieved by the thermally reversible color forming composition, wherein the —X— in the formula of the carboxylic acid compound may be expressed as:

$$—Y—(R_3—Y')_r—$$

wherein Y and Y' represents, respectively, a divalent group having at least one hetero atom, $R_3$ represents a divalent hydrocarbon group whose principle chain may contain a non-limiting number of carbon atoms, a portion of which may form aromatic ring(s), and $_r$ represents an integer between 1 and 4, and when $_r$ is more than 2, $R_3$ and Y', respectively, may be the same or different.

The objects described above are also achieved by the thermally reversible color forming composition, wherein the carboxylic acid compound has a general formula selected from the group consisting of following:

$$R_1—Y—R_3—Y'—R_2—COOH$$

$$R_1—Y—R_3—Y'—R_3'—Y''—R_2—COOH$$

$$R_1—Y—R_3—Y'—R_3'—Y''—R_3''—Y'''—R_2—COOH,$$

and $$R_1—Y—R_3—Y'—R_3'—Y''—R_3''—Y'''—R_3'''—Y''''—R_2—COOH$$

wherein $R_3'$, $R_3''$ and $R_3'''$, respectively, has the same definition as $R_3$ and they may be one of the same and different from each other, and Y'', Y''' and Y'''' has the same definition as Y, and they may be one of the same and different from each other.

According to the above thermally reversible color forming compositions, a stability in color formation and color deletion may be maintained even after repeated use, and a practically sufficient deletion speed of an colored image may be obtained.

The objects described above are also achieved by a thermally reversible recording medium comprising a supporting layer and a recording layer formed on the supporting layer, wherein the recording layer is comprised, as a main component, of a thermally reversible color forming composition comprising an electron-donating chromophoric compound and an electron-accepting compound, by which a color may be formed and deleted depending on at least one of a temperature for the thermally reversible color forming composition and a cooling rate for the thermally reversible color forming composition after heating the thermally reversible color forming composition, wherein a carboxylic acid compound having the following general formula:

$$R_1—X—R_2—COOH$$

(wherein X represents a divalent group having at least one hetero atom, $R_1$ represents a hydrocarbon group which may be substituted and $R_2$ represents an aliphatic hydrocarbon group, which may be substituted and whose principle chain containing less than 6 carbon atoms) is used as the electron-accepting compound.

The objects described above are also achieved by the thermally reversible recording medium, wherein the carboxylic acid compound has the following general formula:

$$CH_3(CH_2)_{m-1}—X—(CH_2)_n—COOH$$

wherein m represents an integer between 8 and 22 and n represents an integer between 0 and 6.

The objects described above are also achieved by the thermally reversible recording medium, wherein the —X— in the formula of the carboxylic acid compound may be expressed as:

$$—Y—(R_3—Y')_r—$$

wherein Y and Y' represents, respectively, a divalent group having at least one hetero atom, $R_3$ represents a divalent hydrocarbon group whose principle chain may contain a non-limiting number of carbon atoms, a portion of which may form aromatic ring(s), and $_r$ represents an integer between 1 and 4, and when $_r$ is more than 2, $R_3$ and Y', respectively, may be the same or different.

The objects described above are also achieved by the thermally reversible recording medium as claimed in claim 10, wherein the carboxylic acid compound has a general formula selected from the group consisting of following:

$$R_1—Y—R_3—Y'—R_2—COOH$$

$$R_1—Y—R_3—Y'—R_3'—Y''—R_2—COOH$$

$$R_1—Y—R_3—Y'—R_3'—Y''—R_3''—Y'''—R_2—COOH,$$

and $$R_1—Y—R_3—Y'—R_3'—Y''—R_3''—Y'''—R_3'''—Y''''—R_2—COOH$$

wherein $R_3'$, $R_3''$ and $R_3'''$, respectively, have the same definition as $R_3$ and they may be one of the same and different from each other, and Y'', Y''' and Y'''' has the same definition as Y, and they may be one of the same and different from each other.

According to the above thermally reversible recording medium, a stability in color formation and color deletion may be maintained even after repeated use, and a practically sufficient deletion speed of an colored image may be obtained. Also, the thermally reversible recording medium has a high contrast and a high durability which is sufficient to be a practical excellent thermally reversible recording medium.

Other objects and further features of the present invention will be apparent from the following detailed description when read in conjunction with the accompanied drawing.

DETAILED DESCRIPTION OF THE PREFERRED EMBODIMENTS

Figure 1:
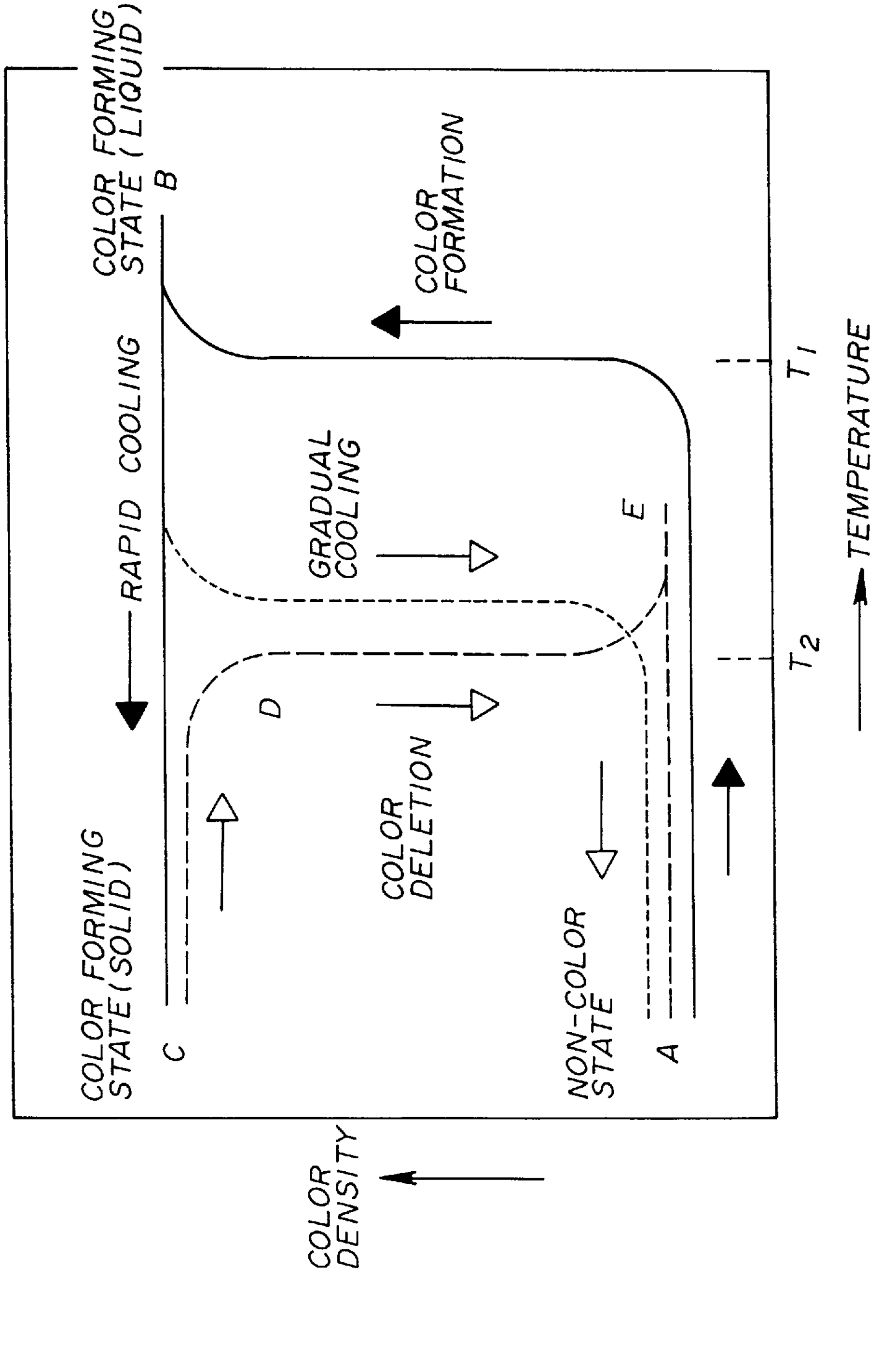
FIG. 1 is a graph showing a color formation/deletion characteristics of a thermally reversible color forming composition according to the present invention.

A thermally reversible color forming composition and a recording medium using the composition according to the present invention will be described in detail hereinafter.

The inventors of the present invention have made a discovery that a balance between the color developing ability of a color developer having a long chain aliphatic group for a color producing agent and a cohesive force among molecules is very important for a reversible color-forming and color-deleting phenomenon caused by a composition comprising a color producing agent and a color developer. Based on this finding, various kinds of compounds were examined and, as a result, it was found that the above-mentioned problems associated with the conventional thermally reversible color forming compositions and thermally reversible recording media using the compositions may be solved by using a carboxylic acid compound having a certain structure as the electron-donating compound.

According to the present invention, a carboxylic acid compound having the following general formula (1):

$$R_1—X—R_2—COOH \qquad (1)$$

(wherein X represents a divalent group having at least one hetero atom, $R_1$ represents a hydrocarbon group which may be unsubstituted or substituted and $R_2$ represents an aliphatic hydrocarbon group, which may be unsubstituted or substituted and whose principle chain containing less than 6 carbon atoms), is used as an electron-accepting compound for a thermally reversible color forming composition. According to the present invention, a colored image is produced by a reversible coloration reaction between the electron-accepting compound and an electron-donating chromophoric compound.

Now, the above-mentioned carboxylic acid compound having the formula (1) will be described in detail.

As described above, $R_1$ represents a hydrocarbon group which may be unsubstituted or substituted by a substituent. $R_1$ may be an aliphatic hydrocarbon group or an aromatic hydrocarbon group or may be a hydrocarbon group comprising both the aromatic moiety and the aliphatic moiety. Also, the aliphatic hydrocarbon group may be of a straight chain or may be branched, and can contain unsaturated bonds. Examples of a typical substituent for the hydrocarbon group include a hydroxy group, halogens, alkoxy groups and so on.

Further, since the stability in a color formation and a color deletion ability of the composition according to the present invention will be decreased if $R_1$ contains less than 7 carbon atoms, it is preferable that $R_1$ contains more than 8 carbon atoms and it is more preferable that $R_1$ contains more than 11 carbon atoms.

Preferable examples of $R_1$ include:

$—(CH_2)p—CH_3$

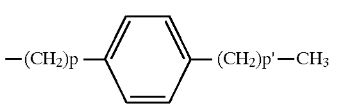

-continued $—(CH_2)pCH{=}CH(CH_2)p'—CH_3$

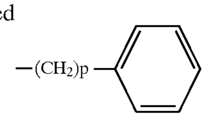

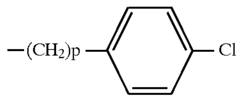

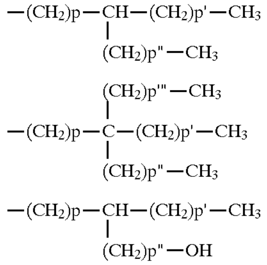

wherein p, p', p" and p"', respectively, preferably represents an integer which satisfies the above mentioned number of carbons for $R_1$.

$R_2$ represents an aliphatic hydrocarbon group, which may be unsubstituted or substituted and whose principle chain contains less than 6 carbon atoms. The aliphatic hydrocarbon group may be of a straight chain or may be branched, and can contain unsaturated bonds. Examples of a typical substituent for the hydrocarbon group include a hydroxy group, halogens and so on.

Also, since the color producing ability of the composition according to the present invention will be decreased if $R_2$ contains more than 7 carbon atoms, it is preferable that $R_2$ contains less than 6 carbon atoms.

Preferable examples of $R_2$ include:

$—(CH_2)q—$ $\quad$ $—(CH_2)qCH{=}CH(CH_2)q'—$

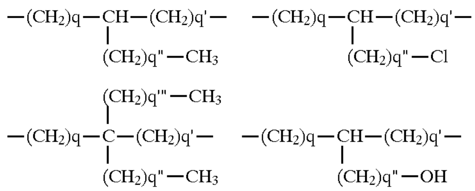

wherein q and p', respectively, preferably represents an integer which satisfies the above mentioned number of carbons for $R_2$, and q" and q"', represents an integer which is not particularly limited but preferable less than 5.

X represents a divalent group having at least one hetero atom. Non-limiting examples of X, according to the present invention, include:

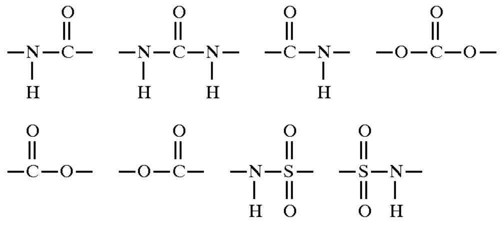

-continued

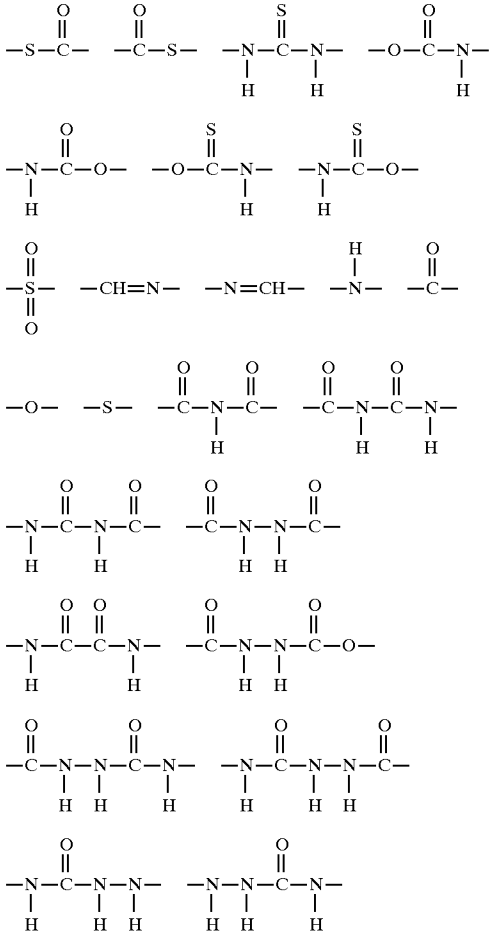

Examples of preferable carboxylic acid compound having the above formula (1) according to the present invention include a compound having the following formula (2):

$$CH_3(CH_2)_{m-1}—X—(CH_2)_n—COOH \quad (2)$$

wherein m represents an integer between 8 and 22 and n represents an integer between 0 and 6.

Examples of carboxylic acid compound having the above formula (1) according to the present invention are shown in the following Tables 1-1 through 1-14. However, they are not by any means to restrict the present invention.

TABLE 1

| Compound No. | $CH_3(CH_2)_{m-1}$— | —X— | —$(CH_2)_n$— |
|---|---|---|---|
| 1 | $CH_3(CH_2)_7$— | —NHCO— | —$CH_2$— |
| 2 | $CH_3(CH_2)_{11}$— | —NHCO— | —$CH_2$— |
| 3 | $CH_3(CH_2)_{13}$— | —NHCO— | —$CH_2$— |
| 4 | $CH_3(CH_2)_{15}$— | —NHCO— | —$CH_2$— |
| 5 | $CH_3(CH_2)_{17}$— | —NHCO— | —$CH_2$— |
| 6 | $CH_3(CH_2)_{19}$— | —NHCO— | —$CH_2$— |
| 7 | $CH_3(CH_2)_{21}$— | —NHCO— | —$CH_2$— |
| 8 | $CH_3(CH_2)_7$— | —NHCO— | —$(CH_2)_2$— |
| 9 | $CH_3(CH_2)_{11}$— | —NHCO— | —$(CH_2)_2$— |
| 10 | $CH_3(CH_2)_{13}$— | —NHCO— | —$(CH_2)_2$— |
| 11 | $CH_3(CH_2)_{15}$— | —NHCO— | —$(CH_2)_2$— |
| 12 | $CH_3(CH_2)_{17}$— | —NHCO— | —$(CH_2)_2$— |
| 13 | $CH_3(CH_2)_{19}$— | —NHCO— | —$(CH_2)_2$— |
| 14 | $CH_3(CH_2)_{21}$— | —NHCO— | —$(CH_2)_2$— |
| 15 | $CH_3(CH_2)_7$— | —NHCO— | —$(CH_2)_3$— |

TABLE 1-continued

| Compound No. | $CH_3(CH_2)_{m-1}$— | —X— | —$(CH_2)_n$— |
|---|---|---|---|
| 16 | $CH_3(CH_2)_{11}$— | —NHCO— | —$(CH_2)_3$— |
| 17 | $CH_3(CH_2)_{13}$— | —NHCO— | —$(CH_2)_3$— |
| 18 | $CH_3(CH_2)_{15}$— | —NHCO— | —$(CH_2)_3$— |
| 19 | $CH_3(CH_2)_{17}$— | —NHCO— | —$(CH_2)_3$— |
| 20 | $CH_3(CH_2)_{19}$— | —NHCO— | —$(CH_2)_3$— |
| 21 | $CH_3(CH_2)_{21}$— | —NHCO— | —$(CH_2)_3$— |
| 22 | $CH_3(CH_2)_7$— | —NHCO— | —$(CH_2)_4$— |
| 23 | $CH_3(CH_2)_{11}$— | —NHCO— | —$(CH_2)_4$— |
| 24 | $CH_3(CH_2)_{13}$— | —NHCO— | —$(CH_2)_4$— |
| 25 | $CH_3(CH_2)_{15}$— | —NHCO— | —$(CH_2)_4$— |
| 26 | $CH_3(CH_2)_{17}$— | —NHCO— | —$(CH_2)_4$— |
| 27 | $CH_3(CH_2)_{19}$— | —NHCO— | —$(CH_2)_4$— |
| 28 | $CH_3(CH_2)_{21}$— | —NHCO— | —$(CH_2)_4$— |
| 29 | $CH_3(CH_2)_{11}$— | —NHCO— | —$(CH_2)_5$— |
| 30 | $CH_3(CH_2)_{13}$— | —NHCO— | —$(CH_2)_5$— |
| 31 | $CH_3(CH_2)_{15}$— | —NHCO— | —$(CH_2)_5$— |
| 32 | $CH_3(CH_2)_{17}$— | —NHCO— | —$(CH_2)_5$— |
| 33 | $CH_3(CH_2)_{11}$— | —NHCO— | —$(CH_2)_6$— |
| 34 | $CH_3(CH_2)_{13}$— | —NHCO— | —$(CH_2)_6$— |
| 35 | $CH_3(CH_2)_{17}$— | —NHCO— | —$(CH_2)_6$— |
| 36 | $CH_3(CH_2)_7$— | —NHCONH— | —$CH_2$— |
| 37 | $CH_3(CH_2)_{11}$— | —NHCONH— | —$CH_2$— |
| 38 | $CH_3(CH_2)_{13}$— | —NHCONH— | —$CH_2$— |
| 39 | $CH_3(CH_2)_{15}$— | —NHCONH— | —$CH_2$— |
| 40 | $CH_3(CH_2)_{17}$— | —NHCONH— | —$CH_2$— |
| 41 | $CH_3(CH_2)_{19}$— | —NHCONH— | —$CH_2$— |
| 42 | $CH_3(CH_2)_{21}$— | —NHCONH— | —$CH_2$— |
| 43 | $CH_3(CH_2)_7$— | —NHCONH— | —$(CH_2)_2$— |
| 44 | $CH_3(CH_2)_{11}$— | —NHCONH— | —$(CH_2)_2$— |
| 45 | $CH_3(CH_2)_{13}$— | —NHCONH— | —$(CH_2)_2$— |
| 46 | $CH_3(CH_2)_{15}$— | —NHCONH— | —$(CH_2)_2$— |
| 47 | $CH_3(CH_2)_{17}$— | —NHCONH— | —$(CH_2)_2$— |
| 48 | $CH_3(CH_2)_{19}$— | —NHCONH— | —$(CH_2)_2$— |
| 49 | $CH_3(CH_2)_{21}$— | —NHCONH— | —$(CH_2)_2$— |
| 50 | $CH_3(CH_2)_7$— | —NHCONH— | —$(CH_2)_3$— |
| 51 | $CH_3(CH_2)_{11}$— | —NHCONH— | —$(CH_2)_3$— |
| 52 | $CH_3(CH_2)_{13}$— | —NHCONH— | —$(CH_2)_3$— |
| 53 | $CH_3(CH_2)_{15}$— | —NHCONH— | —$(CH_2)_3$— |
| 54 | $CH_3(CH_2)_{17}$— | —NHCONH— | —$(CH_2)_3$— |
| 55 | $CH_3(CH_2)_{19}$— | —NHCONH— | —$(CH_2)_3$— |
| 56 | $CH_3(CH_2)_{21}$— | —NHCONH— | —$(CH_2)_3$— |
| 57 | $CH_3(CH_2)_7$— | —NHCONH— | —$(CH_2)_4$— |
| 58 | $CH_3(CH_2)_{11}$— | —NHCONH— | —$(CH_2)_4$— |
| 59 | $CH_3(CH_2)_{13}$— | —NHCONH— | —$(CH_2)_4$— |
| 60 | $CH_3(CH_2)_{15}$— | —NHCONH— | —$(CH_2)_4$— |
| 61 | $CH_3(CH_2)_{17}$— | —NHCONH— | —$(CH_2)_4$— |
| 62 | $CH_3(CH_2)_{19}$— | —NHCONH— | —$(CH_2)_4$— |
| 63 | $CH_3(CH_2)_{21}$— | —NHCONH— | —$(CH_2)_4$— |
| 64 | $CH_3(CH_2)_{11}$— | —NHCONH— | —$(CH_2)_5$— |
| 65 | $CH_3(CH_2)_{13}$— | —NHCONH— | —$(CH_2)_5$— |
| 66 | $CH_3(CH_2)_{15}$— | —NHCONH— | —$(CH_2)_5$— |
| 67 | $CH_3(CH_2)_{17}$— | —NHCONH— | —$(CH_2)_5$— |
| 68 | $CH_3(CH_2)_{11}$— | —NHCONH— | —$(CH_2)_6$— |
| 69 | $CH_3(CH_2)_{13}$— | —NHCONH— | —$(CH_2)_6$— |
| 70 | $CH_3(CH_2)_{17}$— | —NHCONH— | —$(CH_2)_6$— |
| 71 | $CH_3(CH_2)_7$— | —$NHSO_2$— | —$CH_2$— |
| 72 | $CH_3(CH_2)_{11}$— | —$NHSO_2$— | —$CH_2$— |
| 73 | $CH_3(CH_2)_{13}$— | —$NHSO_2$— | —$CH_2$— |
| 74 | $CH_3(CH_2)_{15}$— | —$NHSO_2$— | —$CH_2$— |
| 75 | $CH_3(CH_2)_{17}$— | —$NHSO_2$— | —$CH_2$— |
| 76 | $CH_3(CH_2)_{19}$— | —$NHSO_2$— | —$CH_2$— |
| 77 | $CH_3(CH_2)_{21}$— | —$NHSO_2$— | —$CH_2$— |
| 78 | $CH_3(CH_2)_7$— | —$NHSO_2$— | —$(CH_2)_2$— |
| 79 | $CH_3(CH_2)_{11}$— | —$NHSO_2$— | —$(CH_2)_2$— |
| 80 | $CH_3(CH_2)_{13}$— | —$NHSO_2$— | —$(CH_2)_2$— |
| 81 | $CH_3(CH_2)_{15}$— | —$NHSO_2$— | —$(CH_2)_2$— |
| 82 | $CH_3(CH_2)_{17}$— | —$NHSO_2$— | —$(CH_2)_2$— |
| 83 | $CH_3(CH_2)_{19}$— | —$NHSO_2$— | —$(CH_2)_2$— |
| 84 | $CH_3(CH_2)_{21}$— | —$NHSO_2$— | —$(CH_2)_2$— |
| 85 | $CH_3(CH_2)_7$— | —$NHSO_2$— | —$(CH_2)_3$— |
| 86 | $CH_3(CH_2)_{11}$— | —$NHSO_2$— | —$(CH_2)_3$— |
| 87 | $CH_3(CH_2)_{13}$— | —$NHSO_2$— | —$(CH_2)_3$— |
| 88 | $CH_3(CH_2)_{15}$— | —$NHSO_2$— | —$(CH_2)_3$— |
| 89 | $CH_3(CH_2)_{17}$— | —$NHSO_2$— | —$(CH_2)_3$— |
| 90 | $CH_3(CH_2)_{19}$— | —$NHSO_2$— | —$(CH_2)_3$— |
| 91 | $CH_3(CH_2)_{21}$— | —$NHSO_2$— | —$(CH_2)_3$— |
| 92 | $CH_3(CH_2)_7$— | —$NHSO_2$— | —$(CH_2)_4$— |

TABLE 1-continued

| Compound No. | $CH_3(CH_2)_{m-1}$— | —X— | —$(CH_2)_n$— |
|---|---|---|---|
| 93 | $CH_3(CH_2)_{11}$— | —$NHSO_2$— | —$(CH_2)_4$— |
| 94 | $CH_3(CH_2)_{13}$— | —$NHSO_2$— | —$(CH_2)_4$— |
| 95 | $CH_3(CH_2)_{15}$— | —$NHSO_2$— | —$(CH_2)_4$— |
| 96 | $CH_3(CH_2)_{17}$— | —$NHSO_2$— | —$(CH_2)_4$— |
| 97 | $CH_3(CH_2)_{19}$— | —$NHSO_2$— | —$(CH_2)_4$— |
| 98 | $CH_3(CH_2)_{21}$— | —$NHSO_2$— | —$(CH_2)_4$— |
| 99 | $CH_3(CH_2)_{11}$— | —$NHSO_2$— | —$(CH_2)_5$— |
| 100 | $CH_3(CH_2)_{13}$— | —$NHSO_2$— | —$(CH_2)_5$— |
| 101 | $CH_3(CH_2)_{15}$— | —$NHSO_2$— | —$(CH_2)_5$— |
| 102 | $CH_3(CH_2)_{17}$— | —$NHSO_2$— | —$(CH_2)_5$— |
| 103 | $CH_3(CH_2)_{11}$— | —$NHSO_2$— | —$(CH_2)_6$— |
| 104 | $CH_3(CH_2)_{13}$— | —$NHSO_2$— | —$(CH_2)_6$— |
| 105 | $CH_3(CH_2)_{17}$— | —$NHSO_2$— | —$(CH_2)_6$— |
| 106 | $CH_3(CH_2)_7$— | —NHCSNH— | —$CH_2$— |
| 107 | $CH_3(CH_2)_{11}$— | —NHCSNH— | —$CH_2$— |
| 108 | $CH_3(CH_2)_{13}$— | —NHCSNH— | —$CH_2$— |
| 109 | $CH_3(CH_2)_{15}$— | —NHCSNH— | —$CH_2$— |
| 110 | $CH_3(CH_2)_{17}$— | —NHCSNH— | —$CH_2$— |
| 111 | $CH_3(CH_2)_{19}$— | —NHCSNH— | —$CH_2$— |
| 112 | $CH_3(CH_2)_{21}$— | —NHCSNH— | —$CH_2$— |
| 113 | $CH_3(CH_2)_7$— | —NHCSNH— | —$(CH_2)_2$— |
| 114 | $CH_3(CH_2)_{11}$— | —NHCSNH— | —$(CH_2)_2$— |
| 115 | $CH_3(CH_2)_{13}$— | —NHCSNH— | —$(CH_2)_2$— |
| 116 | $CH_3(CH_2)_{15}$— | —NHCSNH— | —$(CH_2)_2$— |
| 117 | $CH_3(CH_2)_{17}$— | —NHCSNH— | —$(CH_2)_2$— |
| 118 | $CH_3(CH_2)_{19}$— | —NHCSNH— | —$(CH_2)_2$— |
| 119 | $CH_3(CH_2)_{21}$— | —NHCSNH— | —$(CH_2)_2$— |
| 120 | $CH_3(CH_2)_7$— | —NHCSNH— | —$(CH_2)_3$— |
| 121 | $CH_3(CH_2)_{11}$— | —NHCSNH— | —$(CH_2)_3$— |
| 122 | $CH_3(CH_2)_{13}$— | —NHCSNH— | —$(CH_2)_3$— |
| 123 | $CH_3(CH_2)_{15}$— | —NHCSNH— | —$(CH_2)_3$— |
| 124 | $CH_3(CH_2)_{17}$— | —NHCSNH— | —$(CH_2)_3$— |
| 125 | $CH_3(CH_2)_{19}$— | —NHCSNH— | —$(CH_2)_3$— |
| 126 | $CH_3(CH_2)_{21}$— | —NHCSNH— | —$(CH_2)_3$— |
| 127 | $CH_3(CH_2)_7$— | —NHCSNH— | —$(CH_2)_4$— |
| 128 | $CH_3(CH_2)_{11}$— | —NHCSNH— | —$(CH_2)_4$— |
| 129 | $CH_3(CH_2)_{13}$— | —NHCSNH— | —$(CH_2)_4$— |
| 130 | $CH_3(CH_2)_{15}$— | —NHCSNH— | —$(CH_2)_4$— |
| 131 | $CH_3(CH_2)_{17}$— | —NHCSNH— | —$(CH_2)_4$— |
| 132 | $CH_3(CH_2)_{19}$— | —NHCSNH— | —$(CH_2)_4$— |
| 133 | $CH_3(CH_2)_{21}$— | —NHCSNH— | —$(CH_2)_4$— |
| 134 | $CH_3(CH_2)_{11}$— | —NHCSNH— | —$(CH_2)_5$— |
| 135 | $CH_3(CH_2)_{13}$— | —NHCSNH— | —$(CH_2)_5$— |
| 136 | $CH_3(CH_2)_{15}$— | —NHCSNH— | —$(CH_2)_5$— |
| 137 | $CH_3(CH_2)_{17}$— | —NHCSNH— | —$(CH_2)_5$— |
| 138 | $CH_3(CH_2)_{11}$— | —NHCSNH— | —$(CH_2)_6$— |
| 139 | $CH_3(CH_2)_{13}$— | —NHCSNH— | —$(CH_2)_6$— |
| 140 | $CH_3(CH_2)_{17}$— | —NHCSNH— | —$(CH_2)_6$— |
| 141 | $CH_3(CH_2)_{12}$— | —CONH— | —$CH_2$— |
| 142 | $CH_3(CH_2)_{14}$— | —CONH— | —$CH_2$— |
| 143 | $CH_3(CH_2)_{16}$— | —CONH— | —$CH_2$— |
| 144 | $CH_3(CH_2)_{20}$— | —CONH— | —$CH_2$— |
| 145 | $CH_3(CH_2)_{12}$— | —CONH— | —$(CH_2)_2$— |
| 146 | $CH_3(CH_2)_{14}$— | —CONH— | —$(CH_2)_2$— |
| 147 | $CH_3(CH_2)_{16}$— | —CONH— | —$(CH_2)_2$— |
| 148 | $CH_3(CH_2)_{20}$— | —CONH— | —$(CH_2)_2$— |
| 149 | $CH_3(CH_2)_{12}$— | —CONH— | —$(CH_2)_3$— |
| 150 | $CH_3(CH_2)_{14}$— | —CONH— | —$(CH_2)_3$— |
| 151 | $CH_3(CH_2)_{16}$— | —CONH— | —$(CH_2)_3$— |
| 152 | $CH_3(CH_2)_{20}$— | —CONH— | —$(CH_2)_3$— |
| 153 | $CH_3(CH_2)_{12}$— | —CONH— | —$(CH_2)_4$— |
| 154 | $CH_3(CH_2)_{14}$— | —CONH— | —$(CH_2)_4$— |
| 155 | $CH_3(CH_2)_{16}$— | —CONH— | —$(CH_2)_4$— |
| 156 | $CH_3(CH_2)_{20}$— | —CONH— | —$(CH_2)_4$— |
| 157 | $CH_3(CH_2)_{12}$— | —CONH— | —$(CH_2)_5$— |
| 158 | $CH_3(CH_2)_{16}$— | —CONH— | —$(CH_2)_5$— |
| 159 | $CH_3(CH_2)_{16}$— | —CONH— | —$(CH_2)_6$— |
| 160 | $CH_3(CH_2)_{14}$— | —COO— | —$CH_2$— |
| 161 | $CH_3(CH_2)_{16}$— | —COO— | —$CH_2$— |
| 162 | $CH_3(CH_2)_{20}$— | —COO— | —$CH_2$— |
| 163 | $CH_3(CH_2)_{12}$— | —COO— | —$(CH_2)_2$— |
| 164 | $CH_3(CH_2)_{14}$— | —COO— | —$(CH_2)_2$— |
| 165 | $CH_3(CH_2)_{16}$— | —COO— | —$(CH_2)_2$— |
| 166 | $CH_3(CH_2)_{14}$— | —COO— | —$(CH_2)_3$— |
| 167 | $CH_3(CH_2)_{16}$— | —COO— | —$(CH_2)_3$— |
| 168 | $CH_3(CH_2)_{20}$— | —COO— | —$(CH_2)_3$— |
| 169 | $CH_3(CH_2)_{12}$— | —COO— | —$(CH_2)_4$— |
| 170 | $CH_3(CH_2)_{14}$— | —COO— | —$(CH_2)_4$— |
| 171 | $CH_3(CH_2)_{16}$— | —COO— | —$(CH_2)_4$— |
| 172 | $CH_3(CH_2)_{14}$— | —COO— | —$(CH_2)_5$— |
| 173 | $CH_3(CH_2)_{16}$— | —COO— | —$(CH_2)_5$— |
| 174 | $CH_3(CH_2)_{14}$— | —COO— | —$(CH_2)_6$— |
| 175 | $CH_3(CH_2)_{16}$— | —COO— | —$(CH_2)_6$— |
| 176 | $CH_3(CH_2)_{12}$— | —CONHCO— | —$CH_2$— |
| 177 | $CH_3(CH_2)_{14}$— | —CONHCO— | —$CH_2$— |
| 178 | $CH_3(CH_2)_{16}$— | —CONHCO— | —$CH_2$— |
| 179 | $CH_3(CH_2)_{20}$— | —CONHCO— | —$CH_2$— |
| 180 | $CH_3(CH_2)_{12}$— | —CONHCO— | —$(CH_2)_2$— |
| 181 | $CH_3(CH_2)_{14}$— | —CONHCO— | —$(CH_2)_2$— |
| 182 | $CH_3(CH_2)_{16}$— | —CONHCO— | —$(CH_2)_2$— |
| 183 | $CH_3(CH_2)_{20}$— | —CONHCO— | —$(CH_2)_2$— |
| 184 | $CH_3(CH_2)_{12}$— | —CONHCO— | —$(CH_2)_3$— |
| 185 | $CH_3(CH_2)_{14}$— | —CONHCO— | —$(CH_2)_3$— |
| 186 | $CH_3(CH_2)_{16}$— | —CONHCO— | —$(CH_2)_3$— |
| 187 | $CH_3(CH_2)_{20}$— | —CONHCO— | —$(CH_2)_3$— |
| 188 | $CH_3(CH_2)_{12}$— | —CONHCO— | —$(CH_2)_4$— |
| 189 | $CH_3(CH_2)_{14}$— | —CONHCO— | —$(CH_2)_4$— |
| 190 | $CH_3(CH_2)_{16}$— | —CONHCO— | —$(CH_2)_4$— |
| 191 | $CH_3(CH_2)_{20}$— | —CONHCO— | —$(CH_2)_4$— |
| 192 | $CH_3(CH_2)_{12}$— | —CONHCO— | —$(CH_2)_5$— |
| 193 | $CH_3(CH_2)_{16}$— | —CONHCO— | —$(CH_2)_5$— |
| 194 | $CH_3(CH_2)_{16}$— | —CONHCO— | —$(CH_2)_6$— |
| 195 | $CH_3(CH_2)_{14}$— | —COS— | —$CH_2$— |
| 196 | $CH_3(CH_2)_{16}$— | —COS— | —$CH_2$— |
| 197 | $CH_3(CH_2)_{20}$— | —COS— | —$CH_2$— |
| 198 | $CH_3(CH_2)_{12}$— | —COS— | —$(CH_2)_2$— |
| 199 | $CH_3(CH_2)_{14}$— | —COS— | —$(CH_2)_2$— |
| 200 | $CH_3(CH_2)_{16}$— | —COS— | —$(CH_2)_2$— |
| 201 | $CH_3(CH_2)_{14}$— | —COS— | —$(CH_2)_3$— |
| 202 | $CH_3(CH_2)_{16}$— | —COS— | —$(CH_2)_3$— |
| 203 | $CH_3(CH_2)_{20}$— | —COS— | —$(CH_2)_3$— |
| 204 | $CH_3(CH_2)_{12}$— | —COS— | —$(CH_2)_4$— |
| 205 | $CH_3(CH_2)_{14}$— | —COS— | —$(CH_2)_4$— |
| 206 | $CH_3(CH_2)_{16}$— | —COS— | —$(CH_2)_4$— |
| 207 | $CH_3(CH_2)_{14}$— | —COS— | —$(CH_2)_5$— |
| 208 | $CH_3(CH_2)_{16}$— | —COS— | —$(CH_2)_5$— |
| 209 | $CH_3(CH_2)_{14}$— | —COS— | —$(CH_2)_6$— |
| 210 | $CH_3(CH_2)_{16}$— | —COS— | —$(CH_2)_6$— |
| 211 | $CH_3(CH_2)_{12}$— | —CO— | —$CH_2$— |
| 212 | $CH_3(CH_2)_{14}$— | —CO— | —$CH_2$— |
| 213 | $CH_3(CH_2)_{16}$— | —CO— | —$CH_2$— |
| 214 | $CH_3(CH_2)_{20}$— | —CO— | —$CH_2$— |
| 215 | $CH_3(CH_2)_{12}$— | —CO— | —$(CH_2)_2$— |
| 216 | $CH_3(CH_2)_{14}$— | —CO— | —$(CH_2)_2$— |
| 217 | $CH_3(CH_2)_{16}$— | —CO— | —$(CH_2)_2$— |
| 218 | $CH_3(CH_2)_{20}$— | —CO— | —$(CH_2)_2$— |
| 219 | $CH_3(CH_2)_{12}$— | —CO— | —$(CH_2)_3$— |
| 220 | $CH_3(CH_2)_{14}$— | —CO— | —$(CH_2)_3$— |
| 221 | $CH_3(CH_2)_{16}$— | —CO— | —$(CH_2)_3$— |
| 222 | $CH_3(CH_2)_{16}$— | —CO— | —$(CH_2)_4$— |
| 223 | $CH_3(CH_2)_{16}$— | —CO— | —$(CH_2)_5$— |
| 224 | $CH_3(CH_2)_{16}$— | —CO— | —$(CH_2)_6$— |
| 225 | $CH_3(CH_2)_{12}$— | —$SO_2$— | —$CH_2$— |
| 226 | $CH_3(CH_2)_{14}$— | —$SO_2$— | —$CH_2$— |
| 227 | $CH_3(CH_2)_{16}$— | —$SO_2$— | —$CH_2$— |
| 228 | $CH_3(CH_2)_{20}$— | —$SO_2$— | —$CH_2$— |
| 229 | $CH_3(CH_2)_{12}$— | —$SO_2$— | —$(CH_2)_2$— |
| 230 | $CH_3(CH_2)_{14}$— | —$SO_2$— | —$(CH_2)_2$— |
| 231 | $CH_3(CH_2)_{16}$— | —$SO_2$— | —$(CH_2)_2$— |
| 232 | $CH_3(CH_2)_{20}$— | —$SO_2$— | —$(CH_2)_2$— |
| 233 | $CH_3(CH_2)_{12}$— | —$SO_2$— | —$(CH_2)_3$— |
| 234 | $CH_3(CH_2)_{14}$— | —$SO_2$— | —$(CH_2)_3$— |
| 235 | $CH_3(CH_2)_{16}$— | —$SO_2$— | —$(CH_2)_3$— |
| 236 | $CH_3(CH_2)_{16}$— | —$SO_2$— | —$(CH_2)_4$— |
| 237 | $CH_3(CH_2)_{16}$— | —$SO_2$— | —$(CH_2)_5$— |
| 238 | $CH_3(CH_2)_{16}$— | —$SO_2$— | —$(CH_2)_6$— |
| 239 | $CH_3(CH_2)_{16}$— | —CONHCONH— | —$CH_2$— |
| 240 | $CH_3(CH_2)_{20}$— | —CONHCONH— | —$CH_2$— |
| 241 | $CH_3(CH_2)_{14}$— | —CONHCONH— | —$(CH_2)_2$— |
| 242 | $CH_3(CH_2)_{16}$— | —CONHCONH— | —$(CH_2)_2$— |
| 243 | $CH_3(CH_2)_{16}$— | —CONHCONH— | —$(CH_2)_3$— |
| 244 | $CH_3(CH_2)_{16}$— | —CONHCONH— | —$(CH_2)_4$— |
| 245 | $CH_3(CH_2)_{16}$— | —CONHCONH— | —$(CH_2)_5$— |
| 246 | $CH_3(CH_2)_{11}$— | —NHCOO— | —$CH_2$— |

TABLE 1-continued

| Compound No. | $CH_3(CH_2)_{m-1}$— | —X— | —$(CH_2)_n$— |
|---|---|---|---|
| 247 | $CH_3(CH_2)_{13}$— | —NHCOO— | —$CH_2$— |
| 248 | $CH_3(CH_2)_{15}$— | —NHCOO— | —$CH_2$— |
| 249 | $CH_3(CH_2)_{17}$— | —NHCOO— | —$CH_2$— |
| 250 | $CH_3(CH_2)_{13}$— | —NHCOO— | —$(CH_2)_2$— |
| 251 | $CH_3(CH_2)_{15}$— | —NHCOO— | —$(CH_2)_2$— |
| 252 | $CH_3(CH_2)_{17}$— | —NHCOO— | —$(CH_2)_2$— |
| 253 | $CH_3(CH_2)_{21}$— | —NHCOO— | —$(CH_2)_2$— |
| 254 | $CH_3(CH_2)_{11}$— | —NHCOO— | —$(CH_2)_3$— |
| 255 | $CH_3(CH_2)_{15}$— | —NHCOO— | —$(CH_2)_3$— |
| 256 | $CH_3(CH_2)_{17}$— | —NHCOO— | —$(CH_2)_3$— |
| 257 | $CH_3(CH_2)_{17}$— | —NHCOO— | —$(CH_2)_4$— |
| 258 | $CH_3(CH_2)_{17}$— | —NHCOO— | —$(CH_2)_5$— |
| 259 | $CH_3(CH_2)_{17}$— | —NHCOO— | —$(CH_2)_6$— |
| 260 | $CH_3(CH_2)_{13}$— | —NHCOS— | —$CH_2$— |
| 261 | $CH_3(CH_2)_{15}$— | —NHCOS— | —$CH_2$— |
| 262 | $CH_3(CH_2)_{17}$— | —NHCOS— | —$CH_2$— |
| 263 | $CH_3(CH_2)_{21}$— | —NHCOS— | —$CH_2$— |
| 264 | $CH_3(CH_2)_{13}$— | —NHCOS— | —$(CH_2)_2$— |
| 265 | $CH_3(CH_2)_{15}$— | —NHCOS— | —$(CH_2)_2$— |
| 266 | $CH_3(CH_2)_{17}$— | —NHCOS— | —$(CH_2)_2$— |
| 267 | $CH_3(CH_2)_{21}$— | —NHCOS— | —$(CH_2)_2$— |
| 268 | $CH_3(CH_2)_{11}$— | —NHCOS— | —$(CH_2)_3$— |
| 269 | $CH_3(CH_2)_{15}$— | —NHCOS— | —$(CH_2)_3$— |
| 270 | $CH_3(CH_2)_{17}$— | —NHCOS— | —$(CH_2)_3$— |
| 271 | $CH_3(CH_2)_{17}$— | —NHCOS— | —$(CH_2)_4$— |
| 272 | $CH_3(CH_2)_{17}$— | —NHCOS— | —$(CH_2)_5$— |
| 273 | $CH_3(CH_2)_{17}$— | —NHCOS— | —$(CH_2)_6$— |
| 274 | $CH_3(CH_2)_{15}$— | —OCONH— | —$CH_2$— |
| 275 | $CH_3(CH_2)_{17}$— | —OCONH— | —$CH_2$— |
| 276 | $CH_3(CH_2)_{15}$— | —OCONH— | —$(CH_2)_2$— |
| 277 | $CH_3(CH_2)_{17}$— | —OCONH— | —$(CH_2)_2$— |
| 278 | $CH_3(CH_2)_{17}$— | —OCONH— | —$(CH_2)_3$— |
| 279 | $CH_3(CH_2)_{17}$— | —OCONH— | —$(CH_2)_4$— |
| 280 | $CH_3(CH_2)_{17}$— | —OCONH— | —$(CH_2)_5$— |
| 281 | $CH_3(CH_2)_{11}$— | —NHCOCONH— | —$CH_2$— |
| 282 | $CH_3(CH_2)_{13}$— | —NHCOCONH— | —$CH_2$— |
| 283 | $CH_3(CH_2)_{15}$— | —NHCOCONH— | —$CH_2$— |
| 284 | $CH_3(CH_2)_{17}$— | —NHCOCONH— | —$CH_2$— |
| 285 | $CH_3(CH_2)_{13}$— | —NHCOCONH— | —$(CH_2)_2$— |
| 286 | $CH_3(CH_2)_{15}$— | —NHCOCONH— | —$(CH_2)_2$— |
| 287 | $CH_3(CH_2)_{17}$— | —NHCOCONH— | —$(CH_2)_2$— |
| 288 | $CH_3(CH_2)_{21}$— | —NHCOCONH— | —$(CH_2)_2$— |
| 289 | $CH_3(CH_2)_{11}$— | —NHCOCONH— | —$(CH_2)_3$— |
| 290 | $CH_3(CH_2)_{15}$— | —NHCOCONH— | —$(CH_2)_3$— |
| 291 | $CH_3(CH_2)_{17}$— | —NHCOCONH— | —$(CH_2)_3$— |
| 292 | $CH_3(CH_2)_{17}$— | —NHCOCONH— | —$(CH_2)_4$— |
| 293 | $CH_3(CH_2)_{17}$— | —NHCOCONH— | —$(CH_2)_5$— |
| 294 | $CH_3(CH_2)_{17}$— | —NHCOCONH— | —$(CH_2)_6$— |
| 295 | $CH_3(CH_2)_{13}$— | —NHCONHNH— | —$CH_2$— |
| 296 | $CH_3(CH_2)_{15}$— | —NHCONHNH— | —$CH_2$— |
| 297 | $CH_3(CH_2)_{17}$— | —NHCONHNH— | —$CH_2$— |
| 298 | $CH_3(CH_2)_{21}$— | —NHCONHNH— | —$CH_2$— |
| 299 | $CH_3(CH_2)_{13}$— | —NHCONHNH— | —$(CH_2)_2$— |
| 300 | $CH_3(CH_2)_{15}$— | —NHCONHNH— | —$(CH_2)_2$— |
| 301 | $CH_3(CH_2)_{17}$— | —NHCONHNH— | —$(CH_2)_2$— |
| 302 | $CH_3(CH_2)_{21}$— | —NHCONHNH— | —$(CH_2)_2$— |
| 303 | $CH_3(CH_2)_{11}$— | —NHCONHNH— | —$(CH_2)_3$— |
| 304 | $CH_3(CH_2)_{15}$— | —NHCONHNH— | —$(CH_2)_3$— |
| 305 | $CH_3(CH_2)_{17}$— | —NHCONHNH— | —$(CH_2)_3$— |
| 306 | $CH_3(CH_2)_{17}$— | —NHCONHNH— | —$(CH_2)_4$— |
| 307 | $CH_3(CH_2)_{17}$— | —NHCONHNH— | —$(CH_2)_5$— |
| 308 | $CH_3(CH_2)_{17}$— | —NHCONHNH— | —$(CH_2)_6$— |
| 309 | $CH_3(CH_2)_{15}$— | —NHCONHNHCO— | —$CH_2$— |
| 310 | $CH_3(CH_2)_{17}$— | —NHCONHNHCO— | —$CH_2$— |
| 311 | $CH_3(CH_2)_{15}$— | —NHCONHNHCO— | —$(CH_2)_2$— |
| 312 | $CH_3(CH_2)_{17}$— | —NHCONHNHCO— | —$(CH_2)_2$— |
| 313 | $CH_3(CH_2)_{17}$— | —NHCONHNHCO— | —$(CH_2)_3$— |
| 314 | $CH_3(CH_2)_{17}$— | —NHCONHNHCO— | —$(CH_2)_4$— |
| 315 | $CH_3(CH_2)_{17}$— | —NHCONHNHCO— | —$(CH_2)_5$— |
| 316 | $CH_3(CH_2)_{11}$— | —OCO— | —$CH_2$— |
| 317 | $CH_3(CH_2)_{13}$— | —OCO— | —$CH_2$— |
| 318 | $CH_3(CH_2)_{15}$— | —OCO— | —$CH_2$— |
| 319 | $CH_3(CH_2)_{17}$— | —OCO— | —$CH_2$— |
| 320 | $CH_3(CH_2)_{13}$— | —OCO— | —$(CH_2)_2$— |
| 321 | $CH_3(CH_2)_{15}$— | —OCO— | —$(CH_2)_2$— |
| 322 | $CH_3(CH_2)_{17}$— | —OCO— | —$(CH_2)_2$— |
| 323 | $CH_3(CH_2)_{21}$— | —OCO— | —$(CH_2)_2$— |

TABLE 1-continued

| Compound No. | $CH_3(CH_2)_{m-1}$— | —X— | —$(CH_2)_n$— |
|---|---|---|---|
| 324 | $CH_3(CH_2)_{11}$— | —OCO— | —$(CH_2)_3$— |
| 325 | $CH_3(CH_2)_{15}$— | —OCO— | —$(CH_2)_3$— |
| 326 | $CH_3(CH_2)_{17}$— | —OCO— | —$(CH_2)_3$— |
| 327 | $CH_3(CH_2)_{17}$— | —OCO— | —$(CH_2)_4$— |
| 328 | $CH_3(CH_2)_{17}$— | —OCO— | —$(CH_2)_5$— |
| 329 | $CH_3(CH_2)_{17}$— | —OCO— | —$(CH_2)_6$— |
| 330 | $CH_3(CH_2)_{13}$— | —OCOO— | —$CH_2$— |
| 331 | $CH_3(CH_2)_{15}$— | —OCOO— | —$CH_2$— |
| 332 | $CH_3(CH_2)_{17}$— | —OCOO— | —$CH_2$— |
| 333 | $CH_3(CH_2)_{21}$— | —OCOO— | —$CH_2$— |
| 334 | $CH_3(CH_2)_{13}$— | —OCOO— | —$(CH_2)_2$— |
| 335 | $CH_3(CH_2)_{15}$— | —OCOO— | —$(CH_2)_2$— |
| 336 | $CH_3(CH_2)_{17}$— | —OCOO— | —$(CH_2)_2$— |
| 337 | $CH_3(CH_2)_{21}$— | —OCOO— | —$(CH_2)_2$— |
| 335 | $CH_3(CH_2)_{11}$— | —OCOO— | —$(CH_2)_3$— |
| 339 | $CH_3(CH_2)_{15}$— | —OCOO— | —$(CH_2)_3$— |
| 340 | $CH_3(CH_2)_{17}$— | —OCOO— | —$(CH_2)_3$— |
| 341 | $CH_3(CH_2)_{17}$— | —OCOO— | —$(CH_2)_4$— |
| 342 | $CH_3(CH_2)_{17}$— | —OCOO— | —$(CH_2)_5$— |
| 343 | $CH_3(CH_2)_{17}$— | —OCOO— | —$(CH_2)_6$— |
| 344 | $CH_3(CH_2)_{15}$— | —SCO— | —$CH_2$— |
| 345 | $CH_3(CH_2)_{17}$— | —SCO— | —$CH_2$— |
| 346 | $CH_3(CH_2)_{15}$— | —SCO— | —$(CH_2)_2$— |
| 347 | $CH_3(CH_2)_{17}$— | —SCO— | —$(CH_2)_2$— |
| 348 | $CH_3(CH_2)_{17}$— | —SCO— | —$(CH_2)_3$— |
| 349 | $CH_3(CH_2)_{17}$— | —SCO— | —$(CH_2)_4$— |
| 350 | $CH_3(CH_2)_{17}$— | —SCO— | —$(CH_2)_5$— |
| 351 | $CH_3(CH_2)_7$— | —NH— | —$CH_2$— |
| 352 | $CH_3(CH_2)_{11}$— | —NH— | —$CH_2$— |
| 353 | $CH_3(CH_2)_{13}$— | —NH— | —$CH_2$— |
| 354 | $CH_3(CH_2)_{15}$— | —NH— | —$CH_2$— |
| 355 | $CH_3(CH_2)_{17}$— | —NH— | —$CH_2$— |
| 356 | $CH_3(CH_2)_{19}$— | —NH— | —$CH_2$— |
| 357 | $CH_3(CH_2)_{21}$— | —NH— | —$CH_2$— |
| 358 | $CH_3(CH_2)_7$— | —NH— | —$(CH_2)_2$— |
| 359 | $CH_3(CH_2)_{11}$— | —NH— | —$(CH_2)_2$— |
| 360 | $CH_3(CH_2)_{13}$— | —NH— | —$(CH_2)_2$— |
| 361 | $CH_3(CH_2)_{15}$— | —NH— | —$(CH_2)_2$— |
| 362 | $CH_3(CH_2)_{17}$— | —NH— | —$(CH_2)_2$— |
| 363 | $CH_3(CH_2)_{19}$— | —NH— | —$(CH_2)_2$— |
| 364 | $CH_3(CH_2)_{21}$— | —NH— | —$(CH_2)_2$— |
| 365 | $CH_3(CH_2)_7$— | —NH— | —$(CH_2)_3$— |
| 366 | $CH_3(CH_2)_{11}$— | —NH— | —$(CH_2)_3$— |
| 367 | $CH_3(CH_2)_{13}$— | —NH— | —$(CH_2)_3$— |
| 368 | $CH_3(CH_2)_{15}$— | —NH— | —$(CH_2)_3$— |
| 369 | $CH_3(CH_2)_{17}$— | —NH— | —$(CH_2)_3$— |
| 370 | $CH_3(CH_2)_{19}$— | —NH— | —$(CH_2)_3$— |
| 371 | $CH_3(CH_2)_{21}$— | —NH— | —$(CH_2)_3$— |
| 372 | $CH_3(CH_2)_7$— | —NH— | —$(CH_2)_4$— |
| 373 | $CH_3(CH_2)_{11}$— | —NH— | —$(CH_2)_4$— |
| 374 | $CH_3(CH_2)_{13}$— | —NH— | —$(CH_2)_4$— |
| 375 | $CH_3(CH_2)_{15}$— | —NH— | —$(CH_2)_4$— |
| 376 | $CH_3(CH_2)_{17}$— | —NH— | —$(CH_2)_4$— |
| 377 | $CH_3(CH_2)_{19}$— | —NH— | —$(CH_2)_4$— |
| 378 | $CH_3(CH_2)_{21}$— | —NH— | —$(CH_2)_4$— |
| 379 | $CH_3(CH_2)_{11}$— | —NH— | —$(CH_2)_5$— |
| 380 | $CH_3(CH_2)_{13}$— | —NH— | —$(CH_2)_5$— |
| 381 | $CH_3(CH_2)_{15}$— | —NH— | —$(CH_2)_5$— |
| 382 | $CH_3(CH_2)_{17}$— | —NH— | —$(CH_2)_5$— |
| 383 | $CH_3(CH_2)_{11}$— | —NH— | —$(CH_2)_6$— |
| 384 | $CH_3(CH_2)_{13}$— | —NH— | —$(CH_2)_6$— |
| 385 | $CH_3(CH_2)_{17}$— | —NH— | —$(CH_2)_6$— |
| 386 | $CH_3(CH_2)_7$— | —O— | —$CH_2$— |
| 387 | $CH_3(CH_2)_{11}$— | —O— | —$CH_2$— |
| 388 | $CH_3(CH_2)_{13}$— | —O— | —$CH_2$— |
| 389 | $CH_3(CH_2)_{15}$— | —O— | —$CH_2$— |
| 390 | $CH_3(CH_2)_{17}$— | —O— | —$CH_2$— |
| 391 | $CH_3(CH_2)_{19}$— | —O— | —$CH_2$— |
| 392 | $CH_3(CH_2)_{21}$— | —O— | —$CH_2$— |
| 393 | $CH_3(CH_2)_7$— | —O— | —$(CH_2)_2$— |
| 394 | $CH_3(CH_2)_{11}$— | —O— | —$(CH_2)_2$— |
| 395 | $CH_3(CH_2)_{13}$— | —O— | —$(CH_2)_2$— |
| 396 | $CH_3(CH_2)_{15}$— | —O— | —$(CH_2)_2$— |
| 397 | $CH_3(CH_2)_{17}$— | —O— | —$(CH_2)_2$— |
| 398 | $CH_3(CH_2)_{19}$— | —O— | —$(CH_2)_2$— |
| 399 | $CH_3(CH_2)_{21}$— | —O— | —$(CH_2)_2$— |
| 400 | $CH_3(CH_2)_7$— | —O— | —$(CH_2)_3$— |

TABLE 1-continued

| Compound No. | $CH_3(CH_2)_{m-1}$— | —X— | —$(CH_2)_n$— |
|---|---|---|---|
| 401 | $CH_3(CH_2)_{11}$— | —O— | —$(CH_2)_3$— |
| 402 | $CH_3(CH_2)_{13}$— | —O— | —$(CH_2)_3$— |
| 403 | $CH_3(CH_2)_{15}$— | —O— | —$(CH_2)_3$— |
| 404 | $CH_3(CH_2)_{17}$— | —O— | —$(CH_2)_3$— |
| 405 | $CH_3(CH_2)_{19}$— | —O— | —$(CH_2)_3$— |
| 406 | $CH_3(CH_2)_{21}$— | —O— | —$(CH_2)_3$— |
| 407 | $CH_3(CH_2)_7$— | —O— | —$(CH_2)_4$— |
| 408 | $CH_3(CH_2)_{11}$— | —O— | —$(CH_2)_4$— |
| 409 | $CH_3(CH_2)_{13}$— | —O— | —$(CH_2)_4$— |
| 410 | $CH_3(CH_2)_{15}$— | —O— | —$(CH_2)_4$— |
| 411 | $CH_3(CH_2)_{17}$— | —O— | —$(CH_2)_4$— |
| 412 | $CH_3(CH_2)_{19}$— | —O— | —$(CH_2)_4$— |
| 413 | $CH_3(CH_2)_{21}$— | —O— | —$(CH_2)_4$— |
| 414 | $CH_3(CH_2)_{11}$— | —O— | —$(CH_2)_5$— |
| 415 | $CH_3(CH_2)_{13}$— | —O— | —$(CH_2)_5$— |
| 416 | $CH_3(CH_2)_{15}$— | —O— | —$(CH_2)_5$— |
| 417 | $CH_3(CH_2)_{17}$— | —O— | —$(CH_2)_5$— |
| 418 | $CH_3(CH_2)_{11}$— | —O— | —$(CH_2)_6$— |
| 419 | $CH_3(CH_2)_{13}$— | —O— | —$(CH_2)_6$— |
| 420 | $CH_3(CH_2)_{17}$— | —O— | —$(CH_2)_6$— |
| 421 | $CH_3(CH_2)_7$— | —S— | —$CH_2$— |
| 422 | $CH_3(CH_2)_{11}$— | —S— | —$CH_2$— |
| 423 | $CH_3(CH_2)_{13}$— | —S— | —$CH_2$— |
| 424 | $CH_3(CH_2)_{15}$— | —S— | —$CH_2$— |
| 425 | $CH_3(CH_2)_{17}$— | —S— | —$CH_2$— |
| 426 | $CH_3(CH_2)_{19}$— | —S— | —$CH_2$— |
| 427 | $CH_3(CH_2)_{21}$— | —S— | —$CH_2$— |
| 425 | $CH_3(CH_2)_7$— | —S— | —$(CH_2)_2$— |
| 429 | $CH_3(CH_2)_{11}$— | —S— | —$(CH_2)_2$— |
| 430 | $CH_3(CH_2)_{13}$— | —S— | —$(CH_2)_2$— |
| 431 | $CH_3(CH_2)_{15}$— | —S— | —$(CH_2)_2$— |
| 432 | $CH_3(CH_2)_{17}$— | —S— | —$(CH_2)_2$— |
| 433 | $CH_3(CH_2)_{19}$— | —S— | —$(CH_2)_2$— |
| 434 | $CH_3(CH_2)_{21}$— | —S— | —$(CH_2)_2$— |
| 435 | $CH_3(CH_2)_7$— | —S— | —$(CH_2)_3$— |
| 436 | $CH_3(CH_2)_{11}$— | —S— | —$(CH_2)_3$— |
| 437 | $CH_3(CH_2)_{13}$— | —S— | —$(CH_2)_3$— |
| 438 | $CH_3(CH_2)_{15}$— | —S— | —$(CH_2)_3$— |
| 439 | $CH_3(CH_2)_{17}$— | —S— | —$(CH_2)_3$— |
| 440 | $CH_3(CH_2)_{19}$— | —S— | —$(CH_2)_3$— |
| 441 | $CH_3(CH_2)_{21}$— | —S— | —$(CH_2)_3$— |
| 442 | $CH_3(CH_2)_7$— | —S— | —$(CH_2)_4$— |
| 443 | $CH_3(CH_2)_{11}$— | —S— | —$(CH_2)_4$— |
| 444 | $CH_3(CH_2)_{13}$— | —S— | —$(CH_2)_4$— |
| 445 | $CH_3(CH_2)_{15}$— | —S— | —$(CH_2)_4$— |
| 446 | $CH_3(CH_2)_{17}$— | —S— | —$(CH_2)_4$— |
| 447 | $CH_3(CH_2)_{19}$— | —S— | —$(CH_2)_4$— |
| 448 | $CH_3(CH_2)_{21}$— | —S— | —$(CH_2)_4$— |
| 449 | $CH_3(CH_2)_{11}$— | —S— | —$(CH_2)_5$— |
| 450 | $CH_3(CH_2)_{13}$— | —S— | —$(CH_2)_5$— |
| 451 | $CH_3(CH_2)_{15}$— | —S— | —$(CH_2)_5$— |
| 452 | $CH_3(CH_2)_{17}$— | —S— | —$(CH_2)_5$— |
| 453 | $CH_3(CH_2)_{11}$— | —S— | —$(CH_2)_6$— |
| 454 | $CH_3(CH_2)_{13}$— | —S— | —$(CH_2)_6$— |
| 455 | $CH_3(CH_2)_{17}$— | —S— | —$(CH_2)_6$— |
| 456 | $CH_3(CH_2)_7$— | —CH=N— | —$CH_2$— |
| 457 | $CH_3(CH_2)_{11}$— | —NH=C— | —$CH_2$— |
| 458 | $CH_3(CH_2)_{13}$— | —CH=N— | —$CH_2$— |
| 459 | $CH_3(CH_2)_{15}$— | —NH=C— | —$CH_2$— |
| 460 | $CH_3(CH_2)_{17}$— | —C=NH— | —$CH_2$— |
| 461 | $CH_3(CH_2)_{19}$— | —CH=N— | —$CH_2$— |
| 462 | $CH_3(CH_2)_{21}$— | —NH=C— | —$CH_2$— |
| 463 | $CH_3(CH_2)_7$— | —CH=N— | —$(CH_2)_2$— |
| 464 | $CH_3(CH_2)_{11}$— | —NH=C— | —$(CH_2)_2$— |
| 465 | $CH_3(CH_2)_{13}$— | —C=NH— | —$(CH_2)_2$— |
| 466 | $CH_3(CH_2)_{15}$— | —CH=N— | —$(CH_2)_2$— |
| 467 | $CH_3(CH_2)_{17}$— | —NH=C— | —$(CH_2)_2$— |
| 468 | $CH_3(CH_2)_{19}$— | —CH=N— | —$(CH_2)_2$— |
| 469 | $CH_3(CH_2)_{21}$— | —NH=C— | —$(CH_2)_2$— |
| 470 | $CH_3(CH_2)_7$— | —C=NH— | —$(CH_2)_3$— |
| 471 | $CH_3(CH_2)_{11}$— | —CH=N— | —$(CH_2)_3$— |
| 472 | $CH_3(CH_2)_{13}$— | —NH=C— | —$(CH_2)_3$— |
| 473 | $CH_3(CH_2)_{15}$— | —CH=N— | —$(CH_2)_3$— |
| 474 | $CH_3(CH_2)_{17}$— | —NH=C— | —$(CH_2)_3$— |
| 475 | $CH_3(CH_2)_{19}$— | —C=NH— | —$(CH_2)_3$— |
| 476 | $CH_3(CH_2)_{21}$— | —CH=N— | —$(CH_2)_3$— |
| 477 | $CH_3(CH_2)_7$— | —NH=C— | —$(CH_2)_4$— |

TABLE 1-continued

| Compound No. | $CH_3(CH_2)_{m-1}$— | —X— | —$(CH_2)_n$— |
|---|---|---|---|
| 478 | $CH_3(CH_2)_{11}$— | —CH=N— | —$(CH_2)_4$— |
| 479 | $CH_3(CH_2)_{13}$— | —NH=C— | —$(CH_2)_4$— |
| 480 | $CH_3(CH_2)_{15}$— | —C=NH— | —$(CH_2)_4$— |
| 481 | $CH_3(CH_2)_{17}$— | —CH=N— | —$(CH_2)_4$— |
| 482 | $CH_3(CH_2)_{19}$— | —NH=C— | —$(CH_2)_4$— |
| 483 | $CH_3(CH_2)_{21}$— | —CH=N— | —$(CH_2)_4$— |
| 484 | $CH_3(CH_2)_{11}$— | —NH=C— | —$(CH_2)_5$— |
| 485 | $CH_3(CH_2)_{13}$— | —C=NH— | —$(CH_2)_5$— |
| 486 | $CH_3(CH_2)_{15}$— | —CH=N— | —$(CH_2)_5$— |
| 487 | $CH_3(CH_2)_{17}$— | —NH=C— | —$(CH_2)_5$— |
| 488 | $CH_3(CH_2)_{11}$— | —CH=N— | —$(CH_2)_6$— |
| 489 | $CH_3(CH_2)_{13}$— | —NH=C— | —$(CH_2)_6$— |
| 490 | $CH_3(CH_2)_{17}$— | —C=NH— | —$(CH_2)_6$— |

Also, in the above formula (1), more than two X (i.e., a divalent group having at least one hetero atom) may be present via a hydrocarbon group such as alkylene group. That is, the carboxylic acid compound of the present invention may have a structure in which X in the above formula has a structure of:

$$—Y—(R_3—Y')_r—$$

wherein Y and Y' represents, respectively, a divalent group having at least one hetero atom, $R_3$ represents a divalent hydrocarbon group whose principle chain may contain a non-limiting number of carbon atoms, a portion of which may form aromatic ring(s), and $_r$ represents an integer between 1 and 4 (note that when $_r$ is more than 2, $R_3$ and Y', respectively, may be the same or different.

Examples of preferable compounds of the above include compounds having the following formulae (3) to (6):

$$R_1—Y—R_3—Y'—R_2—COOH \quad (3)$$

$$R_1—Y—R_3—Y'—R_3'—Y''—R_2—COOH \quad (4)$$

$$R_1—Y—R_3—Y'—R_3'—Y''—R_3''—Y'''—R_2—COOH \quad (5)$$

$$R_1—Y—R_3—Y'—R_3'—Y''—R_3''—Y'''—R_3'''—Y''''—R_2—COOH \quad (6)$$

wherein $R_3'$, $R_3''$ and $R_3'''$, respectively, has the same definition as $R_3$ and they can be the same or different, and Y'', Y''' and Y'''' has the same definition as Y, and they can be the same or different.

Examples of the above compounds wherein $R_3$, $R_3'$, $R_3''$ and $R_3'''$, respectively, is an alkylene group may be as follows:

$$CH_3(CH_2)_{m-1}—Y—(CH_2)_w—Y'—(CH_2)_n—COOH \quad (7)$$

$$CH_3(CH_2)_{m-1}—Y—(CH_2)_w—Y'—(CH_2)_x—Y''—(CH_2)_n—COOH \quad (8)$$

$$CH_3(CH_2)_{m-1}—Y—(CH_2)_w—Y'—(CH_2)_x—Y''—(CH_2)_y—Y'''—(CH_2)_n—COOH \quad (9)$$

$$CH_3(CH_2)_{m-1}—Y—(CH_2)_w—Y'—(CH_2)_x—Y''—(CH_2)_y—Y'''—(CH_2)_z—Y''''—(CH_2)_n—COOH \quad (10)$$

wherein $_w$, $_x$, $_y$ and $_z$, respectively, represents an integer between zero and 8 preferably but not particularly limited.

Examples of carboxylic acid compound having the above formula (7) according to the present invention are shown in the following Tables 2-1 through 2-5. Although examples of carboxylic acid compounds having the above formulae (8) to (10) are not shown, the same Y, Y', Y", Y"' and Y"" shown in Tables 2-1 through 2-5 may be applied to these compounds. However, they are not by any means to restrict the present invention.

TABLE 2

| Compound No. | $CH_3(CH_2)_{m-1}$— | —Y— | —$(CH_2)_w$— | —Y'— | —$(CH_2)_n$— |
|---|---|---|---|---|---|
| 491 | $CH_3(CH_2)_{21}$— | —NH— | —$(CH_2)_4$— | —NHCO— | —$CH_2$— |
| 492 | $CH_3(CH_2)_{17}$— | —NH— | —$(CH_2)_2$— | —NHCO— | —$(CH_2)_2$— |
| 493 | $CH_3(CH_2)_{16}$— | —CO— | —$(CH_2)_2$— | —NHCO— | —$(CH_2)_2$— |
| 494 | $CH_3(CH_2)_{16}$— | —CO— | —$CH_2$— | —NHCO— | —$(CH_2)_2$— |
| 495 | $CH_3(CH_2)_{17}$— | —O— | —$(CH_2)_5$— | —NHCO— | —$(CH_2)_5$— |
| 496 | $CH_3(CH_2)_{17}$— | —O— | —$(CH_2)_2$— | —NHCO— | —$(CH_2)_2$— |
| 497 | $CH_3(CH_2)_{11}$— | —O— | —$(CH_2)_4$— | —NHCO— | —$(CH_2)_3$— |
| 498 | $CH_3(CH_2)_{17}$— | —S— | —$(CH_2)_3$— | —NHCO— | —$CH_2$— |
| 499 | $CH_3(CH_2)_{17}$— | —S— | —$(CH_2)_4$— | —NHCO— | —$CH_2$— |
| 500 | $CH_3(CH_2)_{17}$— | —$SO_2$— | —$(CH_2)_2$— | —NHCO— | —$(CH_2)_2$— |
| 501 | $CH_3(CH_2)_{17}$— | —$SO_2$— | —$(CH_2)_5$— | —NHCO— | —$(CH_2)_5$— |
| 502 | $CH_3(CH_2)_{17}$— | —NHCOO— | —$CH_2$— | —NHCO— | —$(CH_2)_2$— |
| 503 | $CH_3(CH_2)_{17}$— | —NHCO— | —$(CH_2)_3$— | —NHCO— | —$CH_2$— |
| 504 | $CH_3(CH_2)_{17}$— | —NHCO— | —$(CH_2)_4$— | —NHCO— | —$CH_2$— |
| 505 | $CH_3(CH_2)_{17}$— | —NHCONH— | —$(CH_2)_2$— | —NHCO— | —$(CH_2)_2$— |
| 506 | $CH_3(CH_2)_{13}$— | —NHCONH— | —$(CH_2)_6$— | —NHCO— | —$(CH_2)_2$— |
| 507 | $CH_3(CH_2)_{13}$— | —NHCONH— | —$(CH_2)_4$— | —NHCO— | —$(CH_2)_3$— |
| 508 | $CH_3(CH_2)_{16}$— | —CONH— | —$(CH_2)_4$— | —NHCO— | —$CH_2$— |
| 509 | $CH_3(CH_2)_{16}$— | —CONH— | —$(CH_2)_3$— | —NHCO— | —$CH_2$— |
| 510 | $CH_3(CH_2)_{17}$— | —$SO_2$NH— | —$(CH_2)_3$— | —NHCO— | —$(CH_2)_3$— |
| 511 | $CH_3(CH_2)_{21}$— | —NHCSNH— | —$(CH_2)_4$— | —NHCO— | —$(CH_2)_2$— |
| 512 | $CH_3(CH_2)_{16}$— | —CONHCONH— | —$(CH_2)_3$— | —NHCO— | —$(CH_2)_3$— |
| 513 | $CH_3(CH_2)_{16}$— | —CONHCO— | —$CH_2$— | —NHCO— | —$CH_2$— |
| 514 | $CH_3(CH_2)_{16}$— | —COO— | —$(CH_2)_2$— | —NHCO— | —$(CH_2)_2$— |
| 515 | $CH_3(CH_2)_{20}$— | —COO— | —$(CH_2)_3$— | —NHCO— | —$(CH_2)_3$— |
| 516 | $CH_3(CH_2)_{16}$— | —COS— | —$(CH_2)_4$— | —NHCO— | —$(CH_2)_6$— |
| 517 | $CH_3(CH_2)_{15}$— | —CH=N— | —$(CH_2)_6$— | —NHCO— | —$(CH_2)_2$— |
| 518 | $CH_3(CH_2)_{17}$— | —NHCONHCO— | —$(CH_2)_2$— | —NHCO— | —$CH_2$— |
| 519 | $CH_3(CH_2)_{16}$— | —CONHNHCO— | —$(CH_2)_3$— | —NHCO— | —$(CH_2)_5$— |
| 520 | $CH_3(CH_2)_{16}$— | —NHNHCONH— | —$(CH_2)_4$— | —NHCO— | —$CH_2$— |
| 521 | $CH_3(CH_2)_{21}$— | —NH— | —$(CH_2)_4$— | —NHCONH— | —$CH_2$— |
| 522 | $CH_3(CH_2)_{17}$— | —NH— | —$(CH_2)_2$— | —NHCONH— | —$(CH_2)_2$— |
| 523 | $CH_3(CH_2)_{16}$— | —CO— | —$(CH_2)_2$— | —NHCONH— | —$(CH_2)_2$— |
| 524 | $CH_3(CH_2)_{16}$— | —CO— | —$CH_2$— | —NHCONH— | —$(CH_2)_2$— |
| 525 | $CH_3(CH_2)_{17}$— | —O— | —$(CH_2)_5$— | —NHCONH— | —$(CH_2)_5$— |
| 526 | $CH_3(CH_2)_{17}$— | —O— | —$(CH_2)_2$— | —NHCONH— | —$(CH_2)_2$— |
| 527 | $CH_3(CH_2)_{11}$— | —O— | —$(CH_2)_4$— | —NHCONH— | —$(CH_2)_3$— |
| 528 | $CH_3(CH_2)_{17}$— | —S— | —$(CH_2)_3$— | —NHCONH— | —$CH_2$— |
| 529 | $CH_3(CH_2)_{17}$— | —S— | —$(CH_2)_4$— | —NHCONH— | —$CH_2$— |
| 530 | $CH_3(CH_2)_{17}$— | —$SO_2$— | —$(CH_2)_2$— | —NHCONH— | —$(CH_2)_2$— |
| 531 | $CH_3(CH_2)_{17}$— | —$SO_2$— | —$(CH_2)_5$— | —NHCONH— | —$(CH_2)_5$— |
| 532 | $CH_3(CH_2)_{17}$— | —NHCOO— | —$CH_2$— | —NHCONH— | —$(CH_2)_2$— |
| 533 | $CH_3(CH_2)_{17}$— | —NHCO— | —$(CH_2)_3$— | —NHCONH— | —$CH_2$— |
| 534 | $CH_3(CH_2)_{17}$— | —NHCO— | —$(CH_2)_4$— | —NHCONH— | —$CH_2$— |
| 535 | $CH_3(CH_2)_{17}$— | —NHCONH— | —$(CH_2)_2$— | —NHCONH— | —$(CH_2)_2$— |
| 536 | $CH_3(CH_2)_{13}$— | —NHCONH— | —$(CH_2)_6$— | —NHCONH— | —$(CH_2)_2$— |
| 537 | $CH_3(CH_2)_{13}$— | —NHCONH— | —$(CH_2)_4$— | —NHCONH— | —$(CH_2)_3$— |
| 538 | $CH_3(CH_2)_{16}$— | —CONH— | —$(CH_2)_4$— | —NHCONH— | —$CH_2$— |
| 539 | $CH_3(CH_2)_{16}$— | —CONH— | —$(CH_2)_3$— | —NHCONH— | —$CH_2$— |
| 540 | $CH_3(CH_2)_{17}$— | —$SO_2$NH— | —$(CH_2)_3$— | —NHCONH— | —$(CH_2)_3$— |
| 541 | $CH_3(CH_2)_{21}$— | —NHCSNH— | —$(CH_2)_4$— | —NHCONH— | —$(CH_2)_2$— |
| 542 | $CH_3(CH_2)_{16}$— | —CONHCONH— | —$(CH_2)_3$— | —NHCONH— | —$(CH_2)_3$— |
| 543 | $CH_3(CH_2)_{16}$— | —CONHCO— | —$CH_2$— | —NHCONH— | —$CH_2$— |
| 544 | $CH_3(CH_2)_{16}$— | —COO— | —$(CH_2)_2$— | —NHCONH— | —$(CH_2)_2$— |
| 545 | $CH_3(CH_2)_{20}$— | —COO— | —$(CH_2)_3$— | —NHCONH— | —$(CH_2)_3$— |
| 546 | $CH_3(CH_2)_{16}$— | —COS— | —$(CH_2)_4$— | —NHCONH— | —$(CH_2)_6$— |
| 547 | $CH_3(CH_2)_{15}$— | —CH=N— | —$(CH_2)_6$— | —NHCONH— | —$(CH_2)_2$— |
| 548 | $CH_3(CH_2)_{17}$— | —NHCONHCO— | —$(CH_2)_2$— | —NHCONH— | —$CH_2$— |
| 549 | $CH_3(CH_2)_{16}$— | —CONHNHCO— | —$(CH_2)_3$— | —NHCONH— | —$(CH_2)_5$— |
| 550 | $CH_3(CH_2)_{16}$— | —NHNHCONH— | —$(CH_2)_4$— | —NHCONH— | —$CH_2$— |
| 551 | $CH_3(CH_2)_{21}$— | —NH— | —$(CH_2)_4$— | —CONH— | —$CH_2$— |
| 552 | $CH_3(CH_2)_{17}$— | —NH— | —$(CH_2)_2$— | —CONH— | —$(CH_2)_2$— |
| 553 | $CH_3(CH_2)_{16}$— | —CO— | —$(CH_2)_2$— | —CONH— | —$(CH_2)_2$— |
| 554 | $CH_3(CH_2)_{16}$— | —CO— | —$CH_2$— | —CONH— | —$(CH_2)_2$— |
| 555 | $CH_3(CH_2)_{17}$— | —O— | —$(CH_2)_5$— | —CONH— | —$(CH_2)_5$— |
| 556 | $CH_3(CH_2)_{17}$— | —O— | —$(CH_2)_2$— | —CONH— | —$(CH_2)_2$— |
| 557 | $CH_3(CH_2)_{11}$— | —O— | —$(CH_2)_4$— | —CONH— | —$(CH_2)_3$— |
| 558 | $CH_3(CH_2)_{17}$— | —S— | —$(CH_2)_3$— | —CONH— | —$CH_2$— |
| 559 | $CH_3(CH_2)_{17}$— | —S— | —$(CH_2)_4$— | —CONH— | —$CH_2$— |
| 560 | $CH_3(CH_2)_{17}$— | —$SO_2$— | —$(CH_2)_2$— | —CONH— | —$(CH_2)_2$— |
| 561 | $CH_3(CH_2)_{17}$— | —$SO_2$— | —$(CH_2)_5$— | —CONH— | —$(CH_2)_5$— |

TABLE 2-continued

| Compound No. | $CH_3(CH_2)_{m-1}$— | —Y— | —$(CH_2)_w$— | —Y'— | —$(CH_2)_n$— |
|---|---|---|---|---|---|
| 562 | $CH_3(CH_2)_{17}$— | —NHCOO— | —$CH_2$— | —CONH— | —$(CH_2)_2$— |
| 563 | $CH_3(CH_2)_{17}$— | —NHCO— | —$(CH_2)_3$— | —CONH— | —$CH_2$— |
| 564 | $CH_3(CH_2)_{17}$— | —NHCO— | —$(CH_2)_4$— | —CONH— | —$CH_2$— |
| 565 | $CH_3(CH_2)_{17}$— | —NHCONH— | —$(CH_2)_2$— | —CONH— | —$(CH_2)_2$— |
| 566 | $CH_3(CH_2)_{13}$— | —NHCONH— | —$(CH_2)_6$— | —CONH— | —$(CH_2)_2$— |
| 567 | $CH_3(CH_2)_{13}$— | —NHCONH— | —$(CH_2)_4$— | —CONH— | —$(CH_2)_3$— |
| 568 | $CH_3(CH_2)_{16}$— | —CONH— | —$(CH_2)_4$— | —CONH— | —$CH_2$— |
| 569 | $CH_3(CH_2)_{16}$— | —CONH— | —$(CH_2)_3$— | —CONH— | —$CH_2$— |
| 570 | $CH_3(CH_2)_{17}$— | —$SO_2$NH— | —$(CH_2)_3$— | —CONH— | —$(CH_2)_3$— |
| 571 | $CH_3(CH_2)_{21}$— | —NHCSNH— | —$(CH_2)_4$— | —CONH— | —$(CH_2)_2$— |
| 572 | $CH_3(CH_2)_{16}$— | —CONHCONH— | —$(CH_2)_3$— | —CONH— | —$(CH_2)_3$— |
| 573 | $CH_3(CH_2)_{16}$— | —CONHCO— | —$CH_2$— | —CONH— | —$CH_2$— |
| 574 | $CH_3(CH_2)_{16}$— | —COO— | —$(CH_2)_2$— | —CONH— | —$(CH_2)_2$— |
| 575 | $CH_3(CH_2)_{20}$— | —COO— | —$(CH_2)_3$— | —CONH— | —$(CH_2)_3$— |
| 576 | $CH_3(CH_2)_{16}$— | —COS— | —$(CH_2)_4$— | —CONH— | —$(CH_2)_6$— |
| 577 | $CH_3(CH_2)_{15}$— | —CH=N— | —$(CH_2)_6$— | —CONH— | —$(CH_2)_2$— |
| 578 | $CH_3(CH_2)_{17}$— | —NHCONHCO— | —$(CH_2)_2$— | —CONH— | —$CH_2$— |
| 579 | $CH_3(CH_2)_{16}$— | —CONHNHCO— | —$(CH_2)_3$— | —CONH— | —$(CH_2)_5$— |
| 580 | $CH_3(CH_2)_{16}$— | —NHNHCONH— | —$(CH_2)_4$— | —CONH— | —$CH_2$— |
| 581 | $CH_3(CH_2)_{21}$— | —O— | —$(CH_2)_4$— | —NHCSNH— | —$CH_2$— |
| 582 | $CH_3(CH_2)_{17}$— | —S— | —$(CH_2)_2$— | —NHCSNH— | —$(CH_2)_2$— |
| 583 | $CH_3(CH_2)_{17}$— | —NHCO— | —$(CH_2)_2$— | —NHCSNH— | —$(CH_2)_2$— |
| 584 | $CH_3(CH_2)_{17}$— | —NHCONH— | —$CH_2$— | —NHCSNH— | —$(CH_2)_2$— |
| 585 | $CH_3(CH_2)_{16}$— | —CONH— | —$(CH_2)_5$— | —NHCSNH— | —$(CH_2)_5$— |
| 586 | $CH_3(CH_2)_{17}$— | —$SO_2$— | —$(CH_2)_2$— | —NHCSNH— | —$(CH_2)_2$— |
| 587 | $CH_3(CH_2)_{12}$— | —COO— | —$(CH_2)_4$— | —NHCSNH— | —$(CH_2)_3$— |
| 588 | $CH_3(CH_2)_{17}$— | —NHCOO— | —$(CH_2)_3$— | —NHCSNH— | —$CH_2$— |
| 589 | $CH_3(CH_2)_{17}$— | —NH$SO_2$— | —$(CH_2)_4$— | —NHCSNH— | —$CH_2$— |
| 590 | $CH_3(CH_2)_{17}$— | —NHNHCONH— | —$(CH_2)_2$— | —NHCSNH— | —$(CH_2)_2$— |
| 591 | $CH_3(CH_2)_{17}$— | —O— | —$(CH_2)_5$— | —$SO_2$— | —$(CH_2)_5$— |
| 592 | $CH_3(CH_2)_{17}$— | —S— | —$CH_2$— | —$SO_2$— | —$(CH_2)_2$— |
| 593 | $CH_3(CH_2)_{17}$— | —NHCO— | —$(CH_2)_3$— | —$SO_2$— | —$CH_2$— |
| 594 | $CH_3(CH_2)_{17}$— | —NHCONH— | —$(CH_2)_4$— | —$SO_2$— | —$CH_2$— |
| 595 | $CH_3(CH_2)_{16}$— | —CONH— | —$(CH_2)_2$— | —$SO_2$— | —$(CH_2)_2$— |
| 596 | $CH_3(CH_2)_{13}$— | —$SO_2$— | —$(CH_2)_6$— | —$SO_2$— | —$(CH_2)_2$— |
| 597 | $CH_3(CH_2)_{12}$— | —COO— | —$(CH_2)_4$— | —$SO_2$— | —$(CH_2)_3$— |
| 598 | $CH_3(CH_2)_{17}$— | —NHCOO— | —$(CH_2)_4$— | —$SO_2$— | —$CH_2$— |
| 599 | $CH_3(CH_2)_{17}$— | —NH$SO_2$— | —$(CH_2)_3$— | —$SO_2$— | —$CH_2$— |
| 600 | $CH_3(CH_2)_{17}$— | —NHNHCONH— | —$(CH_2)_3$— | —$SO_2$— | —$(CH_2)_3$— |
| 601 | $CH_3(CH_2)_{21}$— | —O— | —$(CH_2)_4$— | —S— | —$(CH_2)_2$— |
| 602 | $CH_3(CH_2)_{15}$— | —S— | —$(CH_2)_3$— | —S— | —$(CH_2)_3$— |
| 603 | $CH_3(CH_2)_{17}$— | —NHCO— | —$CH_2$— | —S— | —$CH_2$— |
| 604 | $CH_3(CH_2)_{17}$— | —NHCONH— | —$(CH_2)_2$— | —S— | —$(CH_2)_2$— |
| 605 | $CH_3(CH_2)_{20}$— | —CONH— | —$(CH_2)_3$— | —S— | —$(CH_2)_3$— |
| 606 | $CH_3(CH_2)_{17}$— | —$SO_2$— | —$(CH_2)_4$— | —S— | —$(CH_2)_6$— |
| 607 | $CH_3(CH_2)_{16}$— | —COO— | —$(CH_2)_6$— | —S— | —$(CH_2)_2$— |
| 608 | $CH_3(CH_2)_{17}$— | —NHCOO— | —$(CH_2)_2$— | —S— | —$CH_2$— |
| 609 | $CH_3(CH_2)_{17}$— | —NH$SO_2$— | —$(CH_2)_3$— | —S— | —$(CH_2)_5$— |
| 610 | $CH_3(CH_2)_{17}$— | —NHNHCONH— | —$(CH_2)_4$— | —S— | —$CH_2$— |
| 611 | $CH_3(CH_2)_{21}$— | —S— | —$(CH_2)_4$— | —OCO— | —$CH_2$— |
| 612 | $CH_3(CH_2)_{17}$— | —$SO_2$— | —$(CH_2)_2$— | —OCO— | —$(CH_2)_2$— |
| 613 | $CH_3(CH_2)_{16}$— | —CONH— | —$(CH_2)_2$— | —OCO— | —$(CH_2)_2$— |
| 614 | $CH_3(CH_2)_{16}$— | —NHCONH— | —$CH_2$— | —OCO— | —$(CH_2)_2$— |
| 615 | $CH_3(CH_2)_{17}$— | —NHCONH— | —$(CH_2)_5$— | —NHCO2— | —$(CH_2)_5$— |
| 616 | $CH_3(CH_2)_{17}$— | —$SO_2$— | —$(CH_2)_2$— | —NHSO2— | —$(CH_2)_2$— |
| 617 | $CH_3(CH_2)_{11}$— | —NHCO— | —$(CH_2)_4$— | —CO— | —$(CH_2)_3$— |
| 618 | $CH_3(CH_2)_{17}$— | —NHCONH— | —$(CH_2)_3$— | —CO— | —$CH_2$— |
| 619 | $CH_3(CH_2)_{17}$— | —$SO_2$— | —$(CH_2)_4$— | —O— | —$CH_2$— |
| 620 | $CH_3(CH_2)_{17}$— | —NHCONH— | —$(CH_2)_2$— | —O— | —$(CH_2)_2$— |
| 621 | $CH_3(CH_2)_{17}$— | —NHCO— | —$(CH_2)_5$— | —O— | —$(CH_2)_5$— |
| 622 | $CH_3(CH_2)_{17}$— | —NHCO— | —$CH_2$— | —CONHCO— | —$(CH_2)_2$— |
| 623 | $CH_3(CH_2)_{17}$— | —NHCO— | —$(CH_2)_3$— | —NHCONHCO— | —$CH_2$— |
| 624 | $CH_3(CH_2)_{17}$— | —NHCONH— | —$(CH_2)_4$— | —CONHCONH— | —$CH_2$— |
| 625 | $CH_3(CH_2)_{17}$— | —NHCO— | —$(CH_2)_2$— | —NHNHCONH— | —$(CH_2)_2$— |
| 626 | $CH_3(CH_2)_{13}$— | —OCO— | —$(CH_2)_6$— | —N=CH— | —$(CH_2)_2$— |

The thermally reversible color forming compounds according to the present invention comprises the above-mentioned color developer and a color producing agent. The color producing agent, as mentioned previously, is an electron donating compound and is a dye precursor (leuco dye) having no color or pale color. The color producing agent that may be used in the present invention is not particularly limited and can be selected from the known color producing agents such as phthalide type compounds, azaphthalide type compounds, fluoran type compounds, phenothiazine type compounds, leuco auramine type compounds and so on. Examples of the color producing agents that may be used in the present invention are as follows:

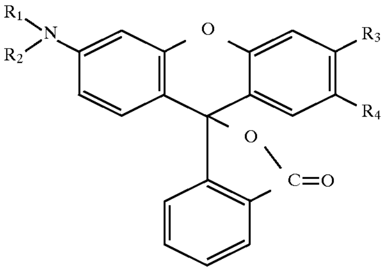

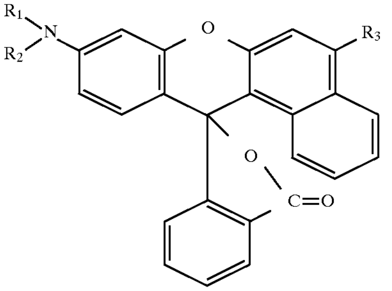

wherein $R_1$ represents a hydrogen or an alkyl group having 1 to 4 carbon atoms; $R_2$ represents an alkyl group having 1 to 6 carbon atoms, cycloalkyl group, or phenyl group which may be unsubstituted or substituted by an alkyl group such as methyl and ethyl, an alkoxy group such as methoxy and ethoxy, or a halogen; $R_3$ represents a hydrogen, an alkyl group having 1 to 2 carbon atoms, an alkoxy group, or a halogen; $R_4$ represents a hydrogen, methyl group, halogen, or an amino group which may be unsubstituted or substituted by an alkyl group, an aryl group which may be substituted by an alkyl group, a halogen, or an alkoxy group, or an aralkyl group which may be substituted by an alkyl group, a halogen, or an alkoxy group.

Examples of the above-mentioned color producing agents include:

2-anilino-3-methyl-6-diethylaminofluoran,
2-anilino-3-methyl-6-di(n-butylamino)fluoran,
2-anilino-3-methyl-6-(N-n-propyl-N-methylamino)fluoran,
2-anilino-3-methyl-6-(N-isopropyl-N-methylamino)fluoran,
2-anilino-3-methyl-6-(N-isobutyl-N-methylamino)fluoran,
2-anilino-3-methyl-6-(N-n-amyl-N-methylamino)fluoran,
2-anilino-3-methyl-6-(N-sec-butyl-N-methylamino)fluoran,
2-anilino-3-methyl-6-(N-n-amyl-N-ethylamino)fluoran,
2-anilino-3-methyl-6-(N-iso-amyl-N-ethylamino)fluoran,
2-anilino-3-methyl-6-(N-n-propyl-N-isopropylamino)fluoran,
2-anilino-3-methyl-6-(N-cyclohexyl-N-methylamino)fluoran,
2-anilino-3-methyl-6-(N-ethyl-p-toluidino)fluoran,
2-anilino-3-methyl-6-(N-methyl-p-toluidino)fluoran,
2-(m-trichloromethylanilino)-3-methyl-6-diethylaminofluoran,
2-(m-trifluoromethylanilino)-3-methyl-6-diethylaminofluoran,
2-(m-trichloromethylanilino)-3-methyl-6-(N-cyclohexyl-N-methylamino)fluoran,
2-(2,4-dimethylanilino)-3-methyl-6-diethylaminofluoran,
2-(N-ethyl-p-toluidino)-3-methyl-6-(N-ethylanilino)fluoran,
2-(N-ethyl-p-toluidino)-3-methyl-6-(N-propyl-p-toluidino)fluoran,
2-anilino-6-(N-n-hexyl-N-ethylaminofluoran,
2-(o-chloroanilino)-6-diethylaminofluoran,
2-(o-chloroanilino)-6-dibutylaminofluoran,
2-(m-trifluoromethylanilino)-6-diethylaminofluoran,
2-(p-acetylanilino)-6-(N-n-amyl-N-n-butylamino)fluoran,
2-benzylamino-6-(N-ethyl-p-toluidino)fluoran,
2-benzylamino-6-(N-methyl-2,4-dimethylanilino)fluoran,
2-benzylamino-6-(N-ethyl-2,4-dimethylanilino)fluoran,
2-benzylamino-6-(N-methyl-p-toluidino)fluoran,
2-(di-p-methylbenzylamino)-6-(N-ethyl-p-toluidino)fluoran,
2-(α-phenylethylamino)-6-(N-ethyl-p-toluidino)fluoran,
2-methylamino-6-(N-methylanilino)fluoran,
2-methylamino-6-(N-ethylanilino)fluoran,
2-methylamino-6-(N-propylanilino)fluoran,
2-ethylamino-6-(N-methyl-p-toluidino)fluoran,
2-methylamino-6-(N-methyl-2,4-dimethylanilino)fluoran,
2-ethylamino-6-(N-ethyl-2,4-dimethylanilino)fluoran,
2-dimethylamino-6-(N-methylanilino)fluoran,
2-dimethylamino-6-(N-ethylanilino)fluoran,
2-diethylamino-6-(N-methyl-p-toluidino)fluoran,
2-diethylamino-6-(N-ethyl-p-toluidino)fluoran,
2-dipropylamino-6-(N-methylanilino)fluoran,
2-dipropylamino-6-(N-ethylanilino)fluoran,
2-amino-6-(N-methylanilino)fluoran,
2-amino-6-(N-ethylanilino)fluoran,
2-amino-6-(N-propylanilino)fluoran,
2-amino-6-(N-methyl-p-toluidino)fluoran,
2-amino-6-(N-ethyl-p-toluidino)fluoran,
2-amino-6-(N-propyl-p-toluidino)fluoran,
2-amino-6-(N-methyl-p-ethylanilino)fluoran,
2-amino-6-(N-methyl-p-ethylanilino)fluoran,
2-amino-6-(N-ethyl-p-ethylanilino)fluoran,
2-amino-6-(N-propyl-p-ethylanilino)fluoran,
2-amino-6-(N-methyl-2,4-dimethylanilino)fluoran,
2-amino-6-(N-ethyl-2,4-dimethylanilino)fluoran,
2-amino-6-(N-propyl-2,4-dimethylanilino)fluoran,
2-amino-6-(N-methyl-p-chloroanilino)fluoran,
2-amino-6-(N-ethyl-p-chloroanilino)fluoran,
2-amino-6-(N-propyl-p-chloroanilino)fluoran,
2,3-dimethyl-6-dimethylaminofluoran,
3-methyl-6-(N-ethyl-p-toluidino)fluoran,
2-chloro-6-diethylaminofluoran,
2-bromo-6-diethylaminofluoran,
2-chloro-6-dipropylaminofluoran,
3-chloro-6-cyclohexylaminofluoran,
3-bromo-6-cyclohexylaminofluoran,
2-chloro-6-(N-ethyl-N-isoamylamino)fluoran,
2-chloro-3-methyl-6-diethylaminofluoran,
2-anilino-3-chloro-6-diethylaminofluoran, 2-(o-chloroanilino)-3-chloro-6-cyclohexylaminofluoran,
2-(m-trifluoromethylanilino)-3-chloro-6-diethylaminofluoran,
2-(2,3-dichloroanilino)-3-chloro-6-diethylaminofluoran,
1,2-benzo-6-diethylaminofluoran,
1,2-benzo-6-(N-ethyl-N-isoamylamino)fluoran,
1,2-benzo-6-dibutylaminofluoran,
1,2-benzo-6-(N-methyl-N-cyclohexylamino)fluoran,
1,2-benzo-6-(N-ethyl-N-toluidino)fluoran, and so on.

Other examples of the color producing agents which may be preferably used in the present invention include:

2-anilino-3-methyl-6-(N-2-ethoxypropyl-N-ethylamino) fluoran,
2-(p-chloroanilino)-6-(N-n-octylamino)fluoran,
2-(p-chloroanilino)-6-(N-n-palmitylamino)fluoran,
2-(p-chloroanilino)-6-(di-n-octylamino)fluoran,
2-benzoylamino-6-(N-ethyl-p-toluidino)fluoran,
2-(o-methoxybenzoylamino)-6-(N-methyl-p-toluidino) fluoran,
2-dibenzylamino-4-methyl-6-diethylamino)fluoran,
2-dibenzylamino-4-methoxy-6-(N-methyl-p-toluidino) fluoran,
2-dibenzylamino-4-methyl-6-(N-ethyl-p-toluidino) fluoran,
2-(α-phenylethylamino)-4-methyl-6-diethylaminofluoran,
2-(p-toluidino)-3-(t-butyl)-6-(N-methyl-p-toluidino) fluoran,
2-(o-methoxycarbonylamino)-6-diethylaminofluoran,
2-acetylamino-6-(N-methyl-p-toluidino)fluoran,
3-diethylamino-6-(m-trifluoromethylanilino)fluoran,
4-methoxy-6-(N-ethyl-p-toluidino)fluoran,
2-ethoxyethylamino-3-chloro-6-dibutylaminofluoran,
2-dibenzylamino-4-chloro-6-(N-ethyl-p-toluidino) fluoran,
2-(α-phenylethylamino)-4-chloro-6-diethylaminofluoran,
2-(N-benzyl-p-trifluoromethylanilino)-4-chloro-6-diethylaminofluoran,
2-anilino-3-methyl-6-pyrrolidinofluoran,
2-anilino-3-chloro-6-pyrrolidinofluoran,
2-anilino-3-methyl-6-(N-ethyl-N-tetrahydrofurfurylamino)fluoran,
2-mesidino-4',5'-benzo-6-diethylaminofluoran,
2-(m-trifluoromethylanilino)-3-methyl-6-pyrrolidinofluoran,
2-(α-naphtylamino)-3,4-benzo-4'-bromo-6-(N-benzyl-N-cyclohexylamino)fluoran,
2-piperidino-6-diethylaminofluoran,
2-(N-n-propyl-p-trifluoromethylanilino)-6-morphorinofluoran,
2-(di-N-p-chlorophenyl-methylamino)-6-pyrrolidinofluoran,
2-(N-n-propyl-m-trifluoromethylanilino)-6-morphorinofluoran,
1,2-benzo-6-(N-ethyl-N-n-octylamino)fluoran,
1,2-benzo-6-diallylamino)fluoran,
1,2-benzo-6-(N-ethoxyethyl-N-ethylamino)fluoran,
benzoleuco-methylene blue,
2-[3,6-bis(diethylamino)]-6-(o-chloroanilino)xanthyl benzoic acid lactam,
2-[3,6-diethylamino]-9-(o-chloroanilino)xanthyl benzoic acid lactam,
3,3-bis(p-dimethylaminophenyl)-phthalide,
3,3-bis(p-dimethylaminophenyl)-6-dimethylaminophthalide (Crystal violet lacton),
3,3-bis-(p-dimethylaminophenyl)-6-diethylaminophthalide,
3,3-bis-(p-dimethylaminophenyl)-6-chlorophthalide,
3,3-bis-(p-dibutylaminophenyl)phthalide,
3-(2-methoxy-4-dimethylaminophenyl)-3-(2-hydroxy-4,5-dichlorophenyl)phthalide,
3-(2-hydroxy-4-dimethylaminophenyl)-3-(2-methoxy-5-chlorophenyl)phthalide,
3-(2-hydroxy-4-dimethoxyaminophenyl)-3-(2-methoxy-5-chlorophenyl)phthalide,
3-(2-hydroxy-4-dimethylaminophenyl)-3-(2-methoxy-5-nitrophenyl)phthalide,
3-(2-hydroxy-4-diethylaminophenyl)-3-(2-methoxy-5-methylphenyl)phthalide,
3-(2-methoxy-4-dimethylaminophenyl)-3-( 2-hydroxy-4-chloro-5-methoxyphenyl)phthalide,
3,6-bis(dimethylamino)fluorenespiro(9,3')-6'-dimethylaminophthalide,
3-(1-ethyl-2-methylindole-3-yl)-3-(2-ethoxy-4-diethylaminophenyl)-4-azaphthalide,
3-(1-octyl-2-methylindole-3-yl)-3-(2-ethoxy-4-diethylaminophenyl)-4-azaphthalide,
3-(1-ethyl-2-methylindole-3-yl)-3-(2-ethoxy-4-diethylaminophenyl)-7-azaphthalide,
3,3-bis(2-ethoxy-4-diethylaminophenyl)-4-azaphthalide,
3,3-bis(2-ethoxy-4-diethylaminophenyl)-7-azaphthalide,
6'-chloro-8'-methoxy-benzoindolino-spiropyran,
6'-bromo-2'-methoxy-benzoindolino-spiropyran, and so on.

The thermally reversible color forming composition according to the present invention has a characteristic in that there are a color forming state and a non-color state depending on a temperature and/or a cooling rate after the composition is heated to a certain temperature.

FIG. 1 is a graph showing the relationship between a color density and a temperature of the thermally reversible color forming composition according to the present invention. As shown in FIG. 1, by heating the composition in a non-color state, indicated by the letter A, a coloration reaction takes place at a temperature, $T_1$, at which the composition starts to melt, and the composition enters into a color forming state (liquid) indicated by B. From this color forming state, B, if the composition is cooled rapidly, the colored state of the composition may be maintained even at a room temperature and the composition enters into a color forming state (solid) (i.e., most of the cases it is considered as a solid state) indicated by C. On the other hand, if the composition is cooled gradually from the color forming state B, its color is lost during the temperature decline and the composition reverts to the non-color state A (i.e., the original state) or enters into a state in which its color density is relatively low compared with the color forming state C.

When the temperature of the composition is increased again from the color forming state C, a color deletion of the composition starts at a temperature, $T_2$, which is a temperature lower than $T_1$, as indicated by a dotted line (from D to E), and if the temperature is lowered from the point E, the composition reverts to the non-color state A (the original state). Thus, the thermally reversible color forming composition according to the present invention may have either a colored state or a non-colored state when it is in a solid state, depending on the cooling rate from the melting liquid state.

The actual color forming temperature and color deletion temperature, respectively, varies depending on the combination of the color producing agent and the color developer actually used. Thus, a suitable combination of the color producing agent and the color developer may be selected according to the desired temperature for color formation and/or color deletion. Also, the color density of the composition in the color forming state (liquid) and that of the composition in the color forming state (solid) are not always the same and may be different depending on such factors as the combination of the color producing agent and the color developer, etc.

In the color forming state C, the molecules of the color producing agent and those of the color developer are mixed in a state (solid state in most cases, as mentioned above) in which they may be contacted and thus reacted with each other. In this state, the color producing agent and the color developer are cohered and the color forming state is maintained. It is considered that the stability in color formation of the compound according to the present invention depends on the cohesive structure of the color producing agent and the color developer.

In the non-color state A, on the other hand, the color producing agent and the color developer are phase-separated. In this state, molecules of at least one of the color producing agent and the color developer forms domains or is crystallized and it is considered that the composition is stabilized by a separation of the color producing agent from the color developer due to this formation of domains or crystals. According to the present invention, a complete deletion of colors is often performed by the phase separation of the color producing agent from the color developer and the crystallization of the color developer. Both the deletion of color from the color forming state B due to a gradual cooling and the deletion of color from the color forming state C due to a temperature increase followed by a temperature decrease shown in FIG. 1 are caused by the phase-separation of the constituents of the composition or the crystallization of the color developer, both of which involve an alteration of cohesive structure of the molecules.

When the thermally reversible color forming composition of the present invention is used in a thermally reversible recording medium, a colored image may be produced by heating the medium (composition) to a temperature at which the composition of the present invention melts by using a heating means such as a thermal head and then rapidly cooling the medium. The deletion of the produced colored image may be performed by gradually cooling the medium (composition) from a heating state or by heating the medium (composition) to a temperature a little less than the coloration temperature of the composition. This means that the composition is temporarily maintained at a temperature at which the composition is phase-separated or at least one of the color producing agent and the color developer is crystallized. The reason that the medium (composition) is rapidly cooled to form a colored image is that the medium (composition) is not maintained at the phase-separation temperature or the crystallization temperature. The terms "rapid cooling" and "gradual cooling" used in this specification are relative terms and the boundary between the two terms varies depending on a combination of the color producing agent and the color developer used.

Although the ratio of the color producing agent and the color developer present in the thermally reversible color forming composition according to the present invention varies depending on the combination of the two compounds, it is generally 1:0.1–20 and preferably 1:0.2–10. If the amount of the color developer is more or less than the above range, the density of formed color will be decreased and the formation of resulting colored image become problematic.

The thermally reversible recording medium according to the present invention comprises a supporting layer and a recording layer formed on the supporting layer, the recording layer including the above-explained thermally reversible color forming composition as a main component.

Any materials which can support the recording layer can be used as the supporting layer. Such materials include paper, resin film, synthesized paper, metal foil, glass and composite materials made of these.

Any kind of recording layer which contains the thermally reversible color forming composition of the present invention may be used for the thermally reversible recording medium. In general, the recording layer is comprised of a binder resin in which fine particles of a color producing agent and a color developer are dispersed homogeneously. The particles of the color producing agent and the color developer may be particulate particles, however, they are preferably in a composite state. This state of the particles may be achieved by melting or dissolving the color producing agent and the color developer.

The thermally reversible recording medium may be formed by dissolving and dispersing each of the constituents of the recording layer in a respective solvent and then mixing each of the solutions followed by an application of the resulting solution onto a supporting layer and drying, or by mixing each of the constituents of the recording layer in a solvent and then applying the resulting dispersed or dissolved solution onto a supporting layer followed by drying. It is possible to envelop the color producing agent and the color developer in microcapsules.

Additives which may improve a color forming/deleting characteristic or an application characteristic of the recording layer can be added to the thermally reversible recording medium of the present invention if necessary. Examples of such additives include dispersing agents, surfactants, conductivity agents, fillers, lubricants, anti-oxidants, light stabilizers, ultraviolet ray absorbents, color forming stabilizers, and color deletion accelerating agents.

Examples of the binder resin which may be used in the recording layer include poly(vinyl chloride), poly(vinyl acetate), vinyl chloride-vinyl acetate copolymer, ethyl cellulose, polystyrene, styrene copolymer, phenoxy resin, polyester, aromatic polyester, polyurethane, polycarbonate, polyacrylate, polymethacrylate, acrylic acid copolymer, maleic acid copolymer, poly(vinyl alcohol), denatured poly (vinyl alcohol), hydroxyethyl cellulose, carboxymethyl cellulose, starch and so on. These binder resins are capable of maintaining a homogeneously dispersed state of each of the constituents of the compositions used for the recording layer even when a thermal energy is applied to the recording layer for recording/deleting an image. Therefore, it is preferable that a resin having an excellent heat resistance capacity is used for the binder resin. Also, it is possible to cross-link a binder resin using, for instance, heat, ultraviolet ray or an electron beam in order to increase its heat resistance.

As mentioned above, the thermally reversible recording medium according to the present invention is basically comprised of a supporting layer and a recording layer formed on the supporting layer. However, the thermally reversible recording medium of the present invention may further include protective layers, adhesive layers, intermediate layers, undercoating layers, backcoating layers, etc., in order to improve its performance as a recording medium.

Now, a surface of the recording layer may be deformed due to heat and/or pressure when a thermal head is used for an image formation. In order to prevent the deformation of the recording layer, it is preferable to provide a protective layer with the recording layer. Examples of the substances which may be used for the protective layer include poly (vinyl alcohol), styrene-maleic anhydride copolymer, carboxy denatured polyethylene, melamine-formaldehyde resin, urea-formaldehyde resin, ultraviolet-cure resin and electron beam-cure resin. Also, it is possible to include additives such as an ultraviolet absorber in the protective layer.

It is preferable to provide an intermediate layer between the recording layer and the protective layer in order to improve adhesibility of the recording layer and the protective layer, to prevent a denaturation of the recording layer due to the application of the protective layer, and to prevent a transfer of the additives contained in the protective layer to the recording layer. Also, it is preferable to use a resin which has a low oxygen permeability for the protective layer and the intermediate layer provided on the recording layer because, in that manner, it is possible to prevent or decrease oxidation of the color producing agent and the color developer contained in the recording layer.

Moreover, it is possible to provide an adiabatic undercoating layer between the supporting layer and the recording layer in order to effectively use the heat applied to the recording medium. The adiabatic undercoating layer may be formed by applying organic or inorganic hollow fine particles using binder resin. Further, it is possible to form an undercoating layer which improves adhesibility of the supporting layer with the recording layer or prevents permeation of recording layer constituents into the supporting layer.

The same resin used for the recording layer may also be used for the intermediate layer and the undercoating layer. Moreover, it is possible to include filler such as calcium carbonate, magnesium carbonate, titanium oxide, silicon oxide, aluminium hydroxide, kaolin and talc in the protective layer, intermediate layer, recording layer and undercoating layer. Other additives such as lubricants and surfactants may also be included in such layers.

In order to produce a colored image using the thermally reversible medium according to the present invention, the medium is heated to a temperature higher than its coloration temperature and then it is rapidly cooled. In practice, when the recording layer is heated for a relatively short time by a thermal head or laser beam, the temperature of a portion of the recording layer may be increased locally to a temperature higher than its coloration temperature and as the application of the heat is stopped, the temperature of the portion of the recording layer is lowered rapidly by diffusion of heat and the colored image is fixed.

In order to delete the formed image, on the other hand, it is necessary to heat the recording layer for a relatively long time using an appropriate heat source and then cool it, or temporarily heat the recording layer at a temperature a little lower than its coloration temperature. That is, if the recording layer is heated for a relatively long time, the temperature of a large area of the recording medium is increased and so it takes a relatively long time to decrease the temperature of it. Thus, the colored image of the recording layer may be deleted during the slow cooling process.

Examples of the above-mentioned heat source that may be used for the slow cooling process of the recording medium include a thermal roller, a thermal stamp and thermal heat. It is possible to use a thermal head for long-time heating. In order to control the temperature of the thermal head, an applied voltage or pulse width for the thermal head may be adjusted so that an applied energy to the recording layer become a little lower than the applied energy which is used during a recording process. By using this method, only a thermal head is necessary for formation/deletion of colored images and thus a so-called overwriting can be performed.

EXAMPLES

The present invention is described in detail using examples hereinafter. Note that the terms “parts” and “%” used in the following examples are based on weight unless otherwise it is noted.

Example 1

A thermally reversible color forming composition according to the present invention was prepared using 2-anilino-3-methyl-6-dibutylaminofluoran as a color producing agent and N'-n-octadecylureido acetic acid as a color developer. The actual preparation procedure of the composition was carried out as follows. First, a mixture of the color producing agent and the color developer (1:3 molar ratio) was ground in a mortar and the powder of the mixture obtained was put on a glass plate with thickness of 1.2 mm. The glass plate was heated to a temperature of 190° C. using a hot plate and the mixture was melted. A cover glass was put on the melted mixture in order to uniformly spread the mixture and the glass plate together with the cover glass was immediately immersed in ice water to rapidly decrease the temperature of the mixture. After that the glass plate was taken out of the water and dried to obtain the composition of the present invention as a colored thin film.

When this colored composition was put on a hot plate heated to a temperature of 120° C., the color of the composition immediately disappeared. After that, when this non-color composition was heated to a temperature of 190° C., the composition turned into a black color.

Thus, it was confirmed that the composition according to the present invention had a reversible color formation/deletion characteristic from the above experiment.

Example 2

The above described procedure used in the Example 1 was repeated except that 3-(N'-n-octadecylureido)propionic acid was used as a color developer instead of N'-n-octadecylureido acetic acid. It was confirmed that the composition prepared in this Example also has the reversible color formation/deletion characteristic.

Example 3

The above described procedure used in the Example 1 was repeated except that 4-(N'-n-octadecylureido)butyric acid was used as a color developer instead of N'-n-octadecylureido acetic acid. It was confirmed that the composition prepared in this Example also has the reversible color formation/deletion characteristic.

Example 4

The above described procedure used in the Example 1 was repeated except that 4-(N'-n-octadecylureido)-3-hydroxybutyric acid was used as a color developer instead of N'-n-octadecylureido acetic acid. It was confirmed that the composition prepared in this Example also has the reversible color formation/deletion characteristic.

Example 5

The above described procedure used in the Example 1 was repeated except that N'-(n-octadecylaminocarbonyl) glycylglycine was used as a color developer instead of N'-n-octadecylureido acetic acid. It was confirmed that the composition prepared in this Example also has the reversible color formation/deletion characteristic.

Example 6

The above described procedure used in the Example 1 was repeated except that N'-(n-octadecylaminocarbonyl) glycylglycylglycine was used as a color developer instead of N'-n-octadecylureido acetic acid. It was confirmed that the composition prepared in this Example also has the reversible color formation/deletion characteristic.

Example 7

The above described procedure used in the Example 1 was repeated except that stearylthioglycolic acid was used as a color developer instead of N'-n-octadecylureido acetic acid. It was confirmed that the composition prepared in this Example also has the reversible color formation/deletion characteristic.

Example 8

The above described procedure used in the Example 1 was repeated except that stearylthiopropionic acid was used as a color developer instead of N'-n-octadecylureido acetic acid. It was confirmed that the composition prepared in this Example also has the reversible color formation/deletion characteristic.

Example 9

The above described procedure used in the Example 1 was repeated except that stearoylglycine was used as a color developer instead of N'-n-octadecylureido acetic acid. It was confirmed that the composition prepared in this Example also has the reversible color formation/deletion characteristic.

Example 10

The above described procedure used in the Example 1 was repeated except that stearoylalanine was used as a color developer instead of N'-n-octadecylureido acetic acid. It was confirmed that the composition prepared in this Example also has the reversible color formation/deletion characteristic.

Example 11

The above described procedure used in the Example 1 was repeated except that monodecylamido adipate was used as a color developer instead of N'-n-octadecylureido acetic acid. It was confirmed that the composition prepared in this Example also has the reversible color formation/deletion characteristic.

Example 12

The above described procedure used in the Example 1 was repeated except that monostearylamido adipate was used as a color developer instead of N'-n-octadecylureido acetic acid. It was confirmed that the composition prepared in this Example also has the reversible color formation/deletion characteristic.

Example 13

The above described procedure used in the Example 1 was repeated except that stearylsulfonyl propionic acid was used as a color developer instead of N'-n-octadecylureido acetic acid. It was confirmed that the composition prepared in this Example also has the reversible color formation/deletion characteristic.

Example 14

The above described procedure used in the Example 1 was repeated except that eicocylsulfonyl propionic acid was used as a color developer instead of N'-n-octadecylureido acetic acid. It was confirmed that the composition prepared in this Example also has the reversible color formation/deletion characteristic.

Example 15

The above described procedure used in the Example 1 was repeated except that stearylsulfonylglycol acid was used as a color developer instead of N'-n-octadecylureido acetic acid. It was confirmed that the composition prepared in this Example also has the reversible color formation/deletion characteristic.

Example 16

The above described procedure used in the Example 1 was repeated except that eicosylsulfonyl glycol acid was used as a color developer instead of N'-n-octadecylureido acetic acid. It was confirmed that the composition prepared in this Example also has the reversible color formation/deletion characteristic.

Example 17

The above described procedure used in the Examples 1-16 was repeated except that 2-anilino-3-methyl-6-N-ethyl-N-p-tolylaminofluoran was used as a color producing agent instead of 2-anilino-3-methyl-6-dibutylaminofluoran. It was confirmed that all the compositions prepared in this Example also has the reversible color formation/deletion characteristic.

Example 18

A solution for applying a thermally reversible recording medium to a recording layer according to the present invention was prepared by a grinding dispersion of the following compounds using a ball mill until a particle size in the range of between 1 and 4 μm was obtained:

| | |
|---|---|
| 2-anilino-3-methyl-6-dibutylaminofluoran | 2 parts |
| N'-n-octadecylureido acetic acid | 8 parts |
| vinyl chloride-vinyl acetate copolymer (Union Carbide Co., VYHH) | 20 parts |
| methylethylketone | 45 parts |
| toluene | 45 parts |

The solution thus produced was applied to a polyester film of 100 μm thickness using a wired-bar, dried, and a thermally reversible recording medium according to the present invention comprising a recording layer of 6.0 μm thickness was produced.

Example 19

The above described procedure used in the Example 18 was repeated except that 3-(N'-n-octadecylureido)propionic acid was used instead of N'-n-octadecylureido acetic acid and a thermally reversible recording medium of the present invention was prepared.

Example 20

The above described procedure used in the Example 18 was repeated except that 4-(N'-n-octadecylureido)propion was used instead of N'-n-octadecylureido acetic acid and a thermally reversible recording medium of the present invention was prepared.

Example 21

The above described procedure used in the Example 18 was repeated except that 4-(N'-n-octadecylureido)-3-hydroxybutyric acid was used instead of N'-n-octadecylureido acetic acid and a thermally reversible recording medium of the present invention was prepared.

Example 22

The above described procedure used in the Example 18 was repeated except that N'-(n-octadecylaminocarbonyl) glycylglycine was used instead of N'-n-octadecylureido acetic acid and a thermally reversible recording medium of the present invention was prepared.

Example 23

The above described procedure used in the Example 18 was repeated except that N'-(n-octadecylaminocarbonyl) glycylglycylglycine was used instead of N'-n-octadecylureido acetic acid and a thermally reversible recording medium of the present invention was prepared.

Example 24

The above described procedure used in the Example 18 was repeated except that stearoylglycine was used instead of N'-n-octadecylureido acetic acid and a thermally reversible recording medium of the present invention was prepared.

Example 25

The above described procedure used in the Example 18 was repeated except that stearoylalanine was used instead of N'-n-octadecylureido acetic acid and a thermally reversible recording medium of the present invention was prepared.

Example 26

The above described procedure used in the Example 18 was repeated except that monodecylamido adipate was used instead of N'-n-octadecylureido acetic acid and a thermally reversible recording medium of the present invention was prepared.

Example 27

The above described procedure used in the Example 18 was repeated except that monostearylamido adipate was used instead of N'-n-octadecylureido acetic acid and a thermally reversible recording medium of the present invention was prepared.

Example 28

The above described procedure used in the Example 18 was repeated except that stearylsulfonyl propionic acid was used instead of N'-n-octadecylureido acetic acid and a thermally reversible recording medium of the present invention was prepared.

Example 29

The above described procedure used in the Example 18 was repeated except that eicocylsulfonyl propionic acid was used instead of N'-n-octadecylureido acetic acid and a thermally reversible recording medium of the present invention was prepared.

Example 30

The above described procedure used in the Example 18 was repeated except that 2-anilino-3-methyl-6-diethylaminofluoran was used instead of 2-anilino-3-methyl-6-dibutylaminofluoran and a thermally reversible recording medium of the present invention was prepared.

Example 31

The above described procedure used in the Example 19 was repeated except that 2-anilino-3-methyl-6-diethylaminofluoran was used instead of 2-anilino-3-methyl-6-dibutylaminofluoran and a thermally reversible recording medium of the present invention was prepared.

Example 32

The above described procedure used in the Example 20 was repeated except that 2-anilino-3-methyl-6-diethylaminofluoran was used instead of 2-anilino-3-methyl-6-dibutylaminofluoran and a thermally reversible recording medium of the present invention was prepared.

Example 33

The above described procedure used in the Example 21 was repeated except that 2-anilino-3-methyl-6-diethylaminofluoran was used instead of 2-anilino-3-methyl-6-dibutylaminofluoran and a thermally reversible recording medium of the present invention was prepared.

Example 34

The above described procedure used in the Example 21 was repeated except that 2-anilino-3-methyl-6-N-ethyl-N-p-tolylaminofluoran was used instead of 2-anilino-3-methyl-6-dibutylaminofluoran and a thermally reversible recording medium of the present invention was prepared.

Example 35

The above described procedure used in the Example 21 was repeated except that 2-(o-chloroanilino)-3-methyl-6-dibutylaminofluoran was used instead of 2-anilino-3-methyl-6-dibutylaminofluoran and a thermally reversible recording medium of the present invention was prepared.

Example 36

The above described procedure used in the Example 22 was repeated except that 2-anilino-3-methyl-6-diethylaminofluoran was used instead of 2-anilino-3-methyl-6-dibutylaminofluoran and a thermally reversible recording medium of the present invention was prepared.

Example 37

The above described procedure used in the Example 23 was repeated except that 2-anilino-3-methyl-6-diethylaminofluoran was used instead of 2-anilino-3-methyl-6-dibutylaminofluoran and a thermally reversible recording medium of the present invention was prepared.

Example 38

The above described procedure used in the Example 18 was repeated except that 2-anilino-3-methyl-6-N-ethyl-N-p-tolylaminofluoran was used instead of 2-anilino-3-methyl-6-dibutylaminofluoran and stearylthioglycol acid was used instead of N'-n-octadecylureido acetic acid, and a thermally reversible recording medium of the present invention was prepared.

Example 39

The above described procedure used in the Example 18 was repeated except that 2-anilino-3-methyl-6-N-ethyl-N-p-tolylaminofluoran was used instead of 2-anilino-3-methyl-6-dibutylaminofluoran and eicosylsulfonyl glycol acid was used instead of N'-n-octadecylureido acetic acid, and a thermally reversible recording medium of the present invention was prepared.

Example 40

The above described procedure used in the Example 18 was repeated except that 2-anilino-3-methyl-6-N-ethyl-N-p-tolylaminofluoran was used instead of 2-anilino-3-methyl-6-dibutylaminofluoran and stearylthioglycol acid was used instead of N'-n-octadecylureido acetic acid, and a thermally reversible recording medium of the present invention was prepared.

Example 41

The above described procedure used in the Example 18 was repeated except that 2-anilino-3-methyl-6-N-ethyl-N-p-tolylaminofluoran was used instead of 2-anilino-3-methyl-6-dibutylaminofluoran and stearylthiopropionic acid was used instead of N'-n-octadecylureido acetic acid, and a thermally reversible recording medium of the present invention was prepared.

Example 42

The above described procedure used in the Example 18 was repeated except that 2-anilino-3-methyl-6-N-ethyl-N-p-tolylaminofluoran was used instead of 2-anilino-3-methyl-6-dibutylaminofluoran and stearoyl-amino-methyl-thiopropionic acid was used instead of N'-n-octadecylureido acetic acid, and a thermally reversible recording medium of the present invention was prepared.

Using the recording media prepared in each of the Examples 18 to 42, a colored image was obtained by carrying out a printing under the following conditions:

Thermal head dot density: 8 dot/mm,

Applied voltage: 13.3 V, and

Applied Pulse width: 1.2 msec.

The optical color density of the colored image on each of the recording media was measured using the Macbeth densitometer RD-914. Then, the color density of each of the colored recording media after heating it for one second using a thermal inclination detector at the temperature shown in the column of “color deleting temperature” (abbreviated as color dele. temp.) in Table 3 for each Example was measured. The results obtained are also shown in Table 3. As can be seen from Table 3, it is clear that the color density of each of the recording medium according to the present invention is decreased to an almost initial color density level of the medium after the one second of heating. Also, it is shown that stable color formation and deletion can be achieved after 10 times of repeated use. Thus, each the recording media according to the present invention is demonstrated to be a thermally reversible recording medium which can perform a fast speed deletion of colored image.

Comparative Example 1

The above described procedure used in the Example 18 was repeated except that eicosyl phosphonic acid was used as a color developer and 2-anilino-3-methyl-6-(N-ethyl-N-p-tolylamino)fluoran was used as a leuco dye, and a recording medium was prepared. Using this recording medium, formation of a colored image (printing) and deletion of the image were performed in the same manner as described in the Example 18. As shown in Table 3, the color of the medium could not be deleted completely after one second of heating. As a matter of fact, it was necessary to heat the medium for one minute to lower its color density to 0.16 which is almost the same as its initial color density.

Comparative Example 2

The above described procedure used in the Example 18 was repeated except that 2-(eicosylthio) succinic acid was used as a color developer, and a recording medium was prepared. Using this recording medium, formation of a colored image (printing) and deletion of the image were performed in the same manner as described in the Example 18. As shown in Table 3, the color of the medium could not be deleted completely after one second of heating. As a matter of fact, it was necessary to heat the medium for ten seconds to lower its color density to 0.21 which is almost the same as its initial color density.

Comparative Example 3

The above described procedure used in the Example 18 was repeated except that α-hydroxyoctadecanoic acid was used as a color developer, and a recording medium was prepared. Using this recording medium, formation of a colored image (printing) and deletion of the image were performed in the same manner as described in the Example 18. As shown in Table 3, the color of the medium could not be deleted completely after one second of heating. As a matter of fact, it was necessary to heat the medium for ten seconds to lower its color density to 0.17 which is almost the same as its initial color density.

Comparative Example 4

The above described procedure used in the Example 18 was repeated except that octadecylmalonic acid was used as a color developer and 2-(o-chloroanilino)-6-dibutylaminofluoran was used as a leuco dye, and a recording medium was prepared. Using this recording medium, formation of a colored image (printing) and deletion of the image were performed in the same manner as described in the Example 18. As shown in Table 3, the color of the medium could not be deleted completely after one second of heating. As a matter of fact, one minute of heating was insufficient for the medium to lower its color density to its initial density.

TABLE 3

| | | | 1st. time | | Aft. 10 times | |
|---|---|---|---|---|---|---|
| | color dele. temp. | init. color dens. | form. color dens. | dele. color dens. | form. color dens. | dele. color dens. |
| Ex 18 | 110° C. | 0.09 | 0.71 | 0.09 | 0.70 | 0.09 |
| Ex 19 | 110° C. | 0.09 | 0.82 | 0.09 | 0.80 | 0.10 |
| Ex 20 | 110° C. | 0.09 | 0.84 | 0.09 | 0.82 | 0.10 |
| Ex 21 | 110° C. | 0.10 | 1.16 | 0.10 | 1.15 | 0.11 |
| Ex 22 | 120° C. | 0.10 | 0.72 | 0.10 | 0.70 | 0.11 |
| Ex 23 | 120° C. | 0.09 | 0.68 | 0.09 | 0.66 | 0.10 |
| Ex 24 | 100° C. | 0.11 | 0.92 | 0.11 | 0.88 | 0.11 |
| Ex 25 | 100° C. | 0.11 | 0.86 | 0.11 | 0.84 | 0.11 |

TABLE 3-continued

| | | | 1st. time | | Aft. 10 times | |
|---|---|---|---|---|---|---|
| | color dele. temp. | init. color dens. | form. color dens. | dele. color dens. | form. color dens. | dele. color dens. |
| Ex 26 | 100° C. | 0.11 | 0.77 | 0.11 | 0.75 | 0.11 |
| Ex 27 | 100° C. | 0.11 | 0.83 | 0.11 | 0.80 | 0.11 |
| Ex 28 | 100° C. | 0.12 | 1.05 | 0.13 | 1.02 | 0.13 |
| Ex 29 | 100° C. | 0.12 | 1.12 | 0.12 | 1.08 | 0.12 |
| Ex 30 | 110° C. | 0.10 | 0.74 | 0.10 | 0.72 | 0.11 |
| Ex 31 | 110° C. | 0.09 | 0.85 | 0.09 | 0.82 | 0.10 |
| Ex 32 | 110° C. | 0.10 | 0.89 | 0.10 | 0.88 | 0.10 |
| Ex 33 | 110° C. | 0.11 | 1.21 | 0.11 | 1.20 | 0.12 |
| Ex 34 | 110° C. | 0.09 | 1.10 | 0.09 | 1.08 | 0.10 |
| Ex 35 | 110° C. | 0.09 | 1.08 | 0.09 | 1.06 | 0.11 |
| Ex 36 | 120° C. | 0.10 | 0.77 | 0.10 | 0.74 | 0.11 |
| Ex 37 | 120° C. | 0.10 | 0.71 | 0.10 | 0.70 | 0.11 |
| Ex 38 | 100° C. | 0.14 | 1.45 | 0.15 | 1.43 | 0.15 |
| Ex 39 | 100° C. | 0.14 | 1.58 | 0.14 | 1.52 | 0.14 |
| Ex 40 | 60° C. | 0.12 | 0.82 | 0.12 | 0.80 | 0.12 |
| Ex 41 | 60° C. | 0.11 | 0.81 | 0.11 | 0.79 | 0.11 |
| Ex 42 | 60° C. | 0.12 | 0.86 | 0.12 | 0.84 | 0.12 |
| CE 1 | 80° C. | 0.15 | 1.10 | 0.45 | 1.08 | 0.48 |
| CE 2 | 70° C. | 0.20 | 1.46 | 0.36 | 1.43 | 0.38 |
| CE 3 | 70° C. | 0.16 | 0.39 | 0.20 | 0.38 | 0.21 |
| CE 4 | 70° C. | 0.22 | 1.70 | 1.29 | 1.67 | 1.28 |

(Ex = Example,
CE = Comparative Example,
color dele. temp. = color deleting temperature,
init. color dens. = initial color density,
form. color dens. = formed color density,
dele. color dens. = deleted color density)

It is obvious that the present invention is not limited to the above-mentioned embodiments, and variations and modifications may be made without departing from the scope of the present invention.

What is claimed is:

1. A thermally reversible color forming composition comprising an electron-donating chromophoric compound and an electron-accepting compound, by which formation and deletion of a color image may be carried out by adjusting thermal energy applied to the composition, wherein said electron-accepting compound is a carboxylic acid compound having the following general formula:

$R_1$—X—$R_2$—COOH wherein, X is selected from the group consisting of

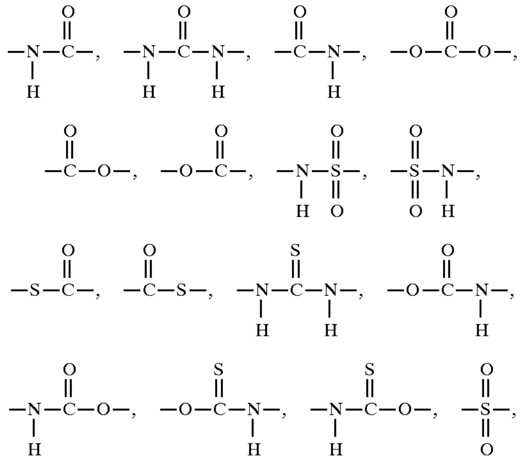

-continued

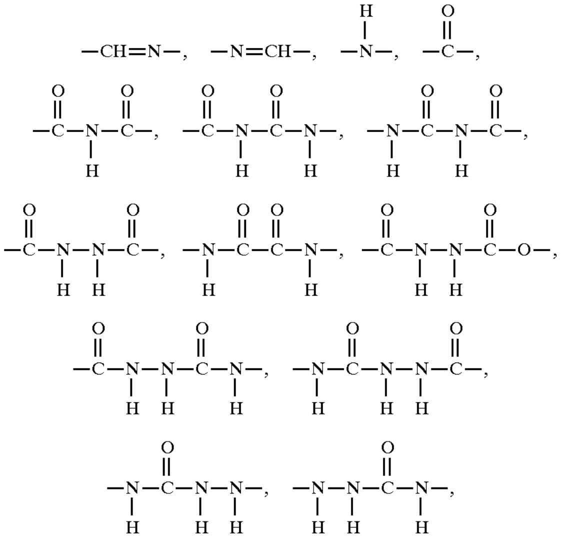

$R_1$ represents a hydrocarbon group which may be substituted and $R_2$ represents an aliphatic hydrocarbon group, which may be substituted and which has a principle chain containing less than 6 carbon atoms.

2. A thermally reversible color forming composition comprising an electron-donating chromophoric compound and an electron-accepting compound, by which formation and deletion of a color image may be carried out by adjusting thermal energy applied to the composition, wherein said electron-accepting compound is a carboxylic acid compound having the following general formula:

$R_1$—X—$R_2$—COOH wherein, X represents a divalent group having at least one hetero atom, $R_1$ represents a hydrocarbon group which is substituted by a substituent selected from the group consisting of a hydroxy group, halogens and alkoxy groups and $R_2$ represents an aliphatic hydrocarbongroup, which may be substituted and which has a principle chain containing less than 6 carbon atoms.

3. A thermally reversible color forming composition comprising an electron-donating chromophoric compound and an electron-accepting compound, by which formation and deletion of a color image may be carried out by adjusting thermal energy applied to the composition, wherein said electron-accepting compound is a carboxylic acid compound having the following general formula:

$R_1$—X—$R_2$—COOH wherein, X represents a divalent group having at least one hetero atom, $R_1$ represents a hydrocarbon group which may be substituted and $R_2$ represents an aliphatic hydrocarbon group having a principle chain which contains less than 6 carbon atoms and which is substituted by a substituent selected from the group consisting of a hydroxy group and halogens.

4. The thermally reversible color forming composition as claimed in claim 3, wherein $R_1$ is substituted by a substituent selected from the group consisting of a hydroxy group, halogens and alkoxy groups.

5. A thermally reversible color forming composition comprising an electron-donating chromophoric compound and an electron-accepting compound, by which formation and deletion of a color image may be carried out by adjusting thermal energy applied to the composition, wherein said electron-accepting compound is a carboxylic acid compound having the following general formula:

$$CH_3(CH_2)_{m-1}—X—(CH_2)_n—COOH$$

wherein, X represents a divalent group having at least one hetero atom, m represents an integer between 8 and 22 and n represents an integer between 0 and 6.

6. A thermally reversible color forming composition comprising an electron-donating chromophoric compound and an electron-accepting compound, by which formation and deletion of a color image may be carried out by adjusting thermal energy applied to the composition, wherein said electron-accepting compound is a carboxylic acid compound having the following general formula:

$$R_1—X—R_2—COOH$$

wherein, X may be expressed as:

$$—Y—(R_3—Y')_r—$$

wherein Y and Y' represent, respectively, a divalent group having at least one hetero atom, $R_3$ represents a divalent hydrocarbon group whose principle chain may contain a non-limiting number of carbon atoms, a portion of which may form aromatic ring(s), and r represents an integer between 1 and 4, and when r is more than 2, $R_3$ and Y', respectively, may be the same or different.

7. The thermally reversible color forming composition as claimed in claim 6, wherein said carboxylic acid compound has a general formula selected from the group consisting of the following formulas:

$$R_1—Y—R_3—Y'—R_2—COOH$$

$$R_1—Y—R_3—Y'—R_3'—Y''—R_2—COOH$$

$$R_1—Y—R_3—Y'—R_3'—Y''—R_3''—Y'''—R_2—COOH,$$

and $$R_1—Y—R_3—Y'—R_3'—Y''—R_3''—Y'''—R_3'''—Y''''—R_2—COOH$$

wherein $R_3'$, $R_3''$ and $R_3'''$, respectively, have the same definition as $R_3$ and $R_3'$, $R_3''$ and $R_3'''$ may be the same or different from each other, and Y'', Y''' and Y'''' have the same definition as Y, and Y'', Y''' and Y'''' may be the same or different from each other.

8. A thermally reversible recording medium comprising a supporting layer and a recording layer formed on said supporting layer, wherein said recording layer is comprised of the thermally reversible color forming composition as claimed in claim 1.

9. A thermally reversible recording medium comprising a supporting layer and a recording layer formed on said supporting layer, wherein said recording layer is comprised of the thermally reversible color forming composition as claimed in claim 5.

10. A thermally reversible recording medium comprising a supporting layer and a recording layer formed on said supporting layer, wherein said recording layer is comprised of the thermally reversible color forming composition as claimed in claim 6.

11. A thermally reversible recording medium comprising a supporting layer and a recording layer formed on said supporting layer, wherein said recording layer is comprised of the thermally reversible color forming composition as claimed in claim 7.

* * * * *

UNITED STATES PATENT AND TRADEMARK OFFICE

CERTIFICATE OF CORRECTION

PATENT NO. : 5,868,821

DATED : February 9, 1999

INVENTOR(S) : Masafumi TORII, et al.

It is certified that error appears in the above-identified patent and that said Letters Patent is hereby corrected as shown below:

On the Title page, item [73] the 1$^{st}$ assignee should be:

--Ricoh Company, Ltd.--

Signed and Sealed this

Fourteenth Day of March, 2000

Attest:

Q. TODD DICKINSON

*Attesting Officer* *Commissioner of Patents and Trademarks*